US011045738B1

(12) United States Patent
Unruh et al.

(10) Patent No.: US 11,045,738 B1
(45) Date of Patent: Jun. 29, 2021

(54) MOTION AND TOY DETECTING BODY ATTACHMENT

(71) Applicant: Hasbro, Inc., Pawtucket, RI (US)

(72) Inventors: Steven Unruh, Cranston, RI (US); Samuel Bowditch Smith, Pawtucket, RI (US)

(73) Assignee: Hasbro, Inc., Pawtucket, RI (US)

( * ) Notice: Subject to any disclaimer, the term of this patent is extended or adjusted under 35 U.S.C. 154(b) by 445 days.

(21) Appl. No.: 15/837,773

(22) Filed: Dec. 11, 2017

Related U.S. Application Data

(60) Provisional application No. 62/433,728, filed on Dec. 13, 2016.

(51) Int. Cl.
| | | |
|---|---|---|
| *A63H 3/36* | (2006.01) | |
| *A63H 33/26* | (2006.01) | |
| *A63H 5/00* | (2006.01) | |
| *A63H 3/00* | (2006.01) | |
| *A63H 27/00* | (2006.01) | |
| *H04W 4/80* | (2018.01) | |

(52) U.S. Cl.
CPC ............ *A63H 3/36* (2013.01); *A63H 3/006* (2013.01); *A63H 5/00* (2013.01); *A63H 27/00* (2013.01); *A63H 33/26* (2013.01); *A63H 2200/00* (2013.01); *H04W 4/80* (2018.02)

(58) Field of Classification Search
CPC .......... A63H 3/003; A63H 3/006; A63H 3/36; A63H 33/00; A63H 33/26; A63H 2200/00
See application file for complete search history.

(56) References Cited

U.S. PATENT DOCUMENTS

| | | |
|---|---|---|
| 4,946,416 A | 8/1990 | Stern et al. |
| 5,195,920 A | 3/1993 | Collier |
| 5,237,617 A | 8/1993 | Miller |
| 5,746,602 A | 5/1998 | Kikinis |
| 5,752,880 A | 5/1998 | Gabai et al. |
| 5,920,024 A | 7/1999 | Moore |
| 5,984,810 A | 11/1999 | Frye et al. |
| 6,022,273 A | 2/2000 | Gabai et al. |
| 6,075,195 A | 6/2000 | Gabai et al. |
| 6,149,490 A | 11/2000 | Hampton et al. |
| 6,150,947 A | 11/2000 | Shima |
| 6,160,986 A | 12/2000 | Gabai et al. |
| 6,206,745 B1 | 3/2001 | Gabai et al. |
| 6,290,565 B1 | 9/2001 | Galyean, III et al. |

(Continued)

FOREIGN PATENT DOCUMENTS

WO 961104053 A1 2/1996

*Primary Examiner* — Eugene L Kim
*Assistant Examiner* — Alyssa M Hylinski
(74) *Attorney, Agent, or Firm* — Perry Hoffman

(57) ABSTRACT

A wearable player body attachment having a master processor, an acceleration detecting motion subsystem for associated motions, a tag reader/antenna subsystem input to recognize unique play object identifiers of toy objects held at the player's hand, and an audio subsystem issuing verbal announcements and sound effects outputs associated with sequences of detected motions. The body attachment queries a database with the toy identity and recognized motions and produces sensory detectible outputs. The database is stored as a matrix table for many figures or vehicles, detects and recognizes specific motions for associated sounds with the action figures toy vehicles, and accessories.

20 Claims, 40 Drawing Sheets

(56) References Cited

U.S. PATENT DOCUMENTS

| | | |
|---|---|---|
| 6,290,566 B1 | 9/2001 | Gabai et al. |
| 6,319,010 B1 | 11/2001 | Kikinis |
| 6,346,025 B1 | 2/2002 | Tachau et al. |
| 6,352,478 B1 | 3/2002 | Gabai et al. |
| 6,356,867 B1 | 3/2002 | Gabai et al. |
| 6,368,177 B1 | 4/2002 | Gabai et al. |
| 6,514,117 B1 | 2/2003 | Hampton et al. |
| 6,544,098 B1 | 4/2003 | Hampton et al. |
| 6,626,728 B2 | 9/2003 | Holt |
| 6,650,870 B2 | 11/2003 | White et al. |
| 6,773,322 B2 | 8/2004 | Gabai et al. |
| 6,773,344 B1 | 8/2004 | Gabai et al. |
| 6,959,166 B1 | 10/2005 | Gabai et al. |
| 7,247,097 B2 | 7/2007 | Woolston |
| 8,025,573 B2 | 9/2011 | Stenton et al. |
| 8,503,570 B2 | 8/2013 | Min |
| 8,597,128 B2 | 12/2013 | Kelly et al. |
| 8,641,474 B2 * | 2/2014 | Lam ..................... H01H 13/70 446/484 |
| 8,894,462 B2 | 11/2014 | Leyland et al. |
| 8,923,885 B2 | 12/2014 | Lefevre et al. |
| 9,269,511 B2 * | 2/2016 | Lam ..................... H01H 13/70 |
| 9,474,961 B2 | 10/2016 | Leyland et al. |
| 9,659,577 B1 | 5/2017 | Langhammer |
| 9,721,586 B1 | 8/2017 | Bay et al. |
| 10,102,836 B2 | 10/2018 | Mintz et al. |
| 2007/0087655 A1 * | 4/2007 | Rifkin ..................... A63H 3/28 446/268 |
| 2012/0194457 A1 * | 8/2012 | Cannon ................... G06F 3/044 345/173 |
| 2014/0287807 A1 * | 9/2014 | Cohen ..................... A63F 13/00 463/7 |
| 2015/0133023 A1 * | 5/2015 | Lewis ..................... A63H 33/26 446/91 |
| 2015/0328541 A1 | 11/2015 | Van Haaften |
| 2016/0004253 A1 | 1/2016 | Bernstein et al. |
| 2017/0116446 A1 * | 4/2017 | Sample .............. G06K 7/10366 |
| 2018/0272240 A1 * | 9/2018 | Soudek ................... A63H 3/28 |

* cited by examiner

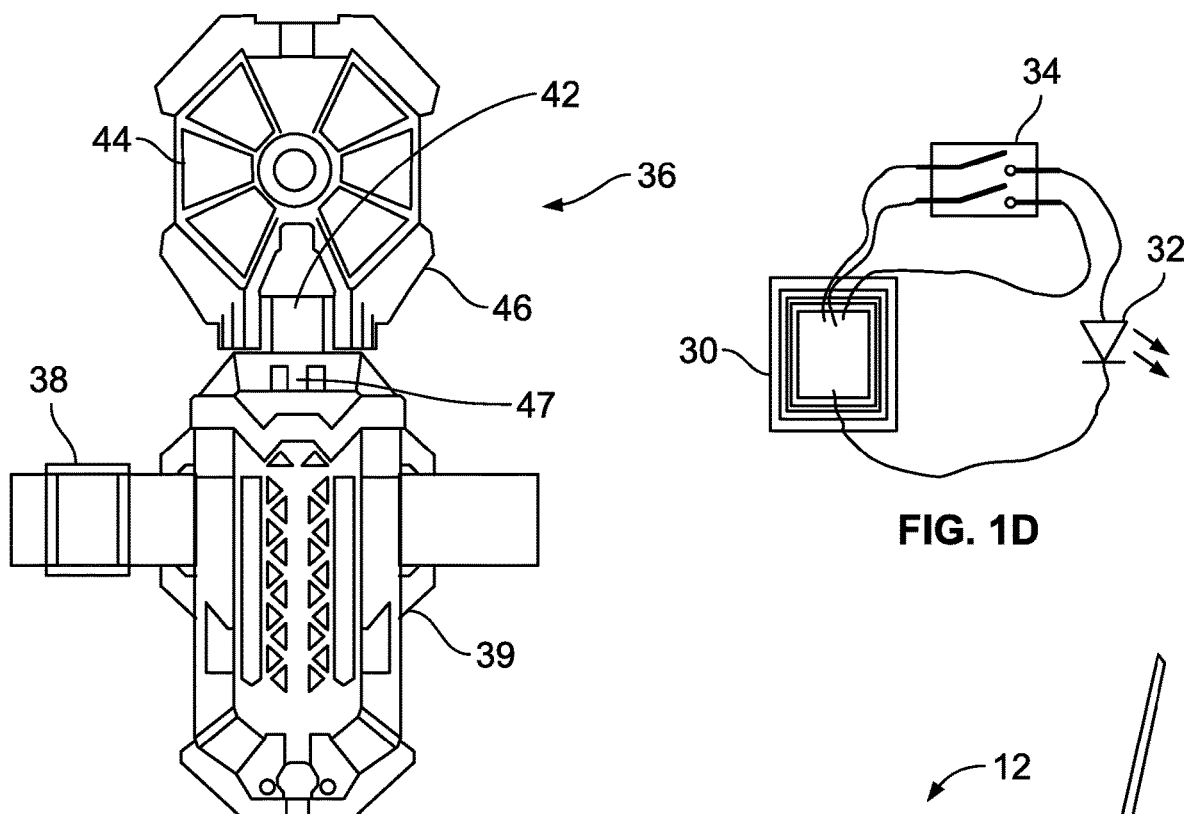
FIG. 1B
FIG. 1D
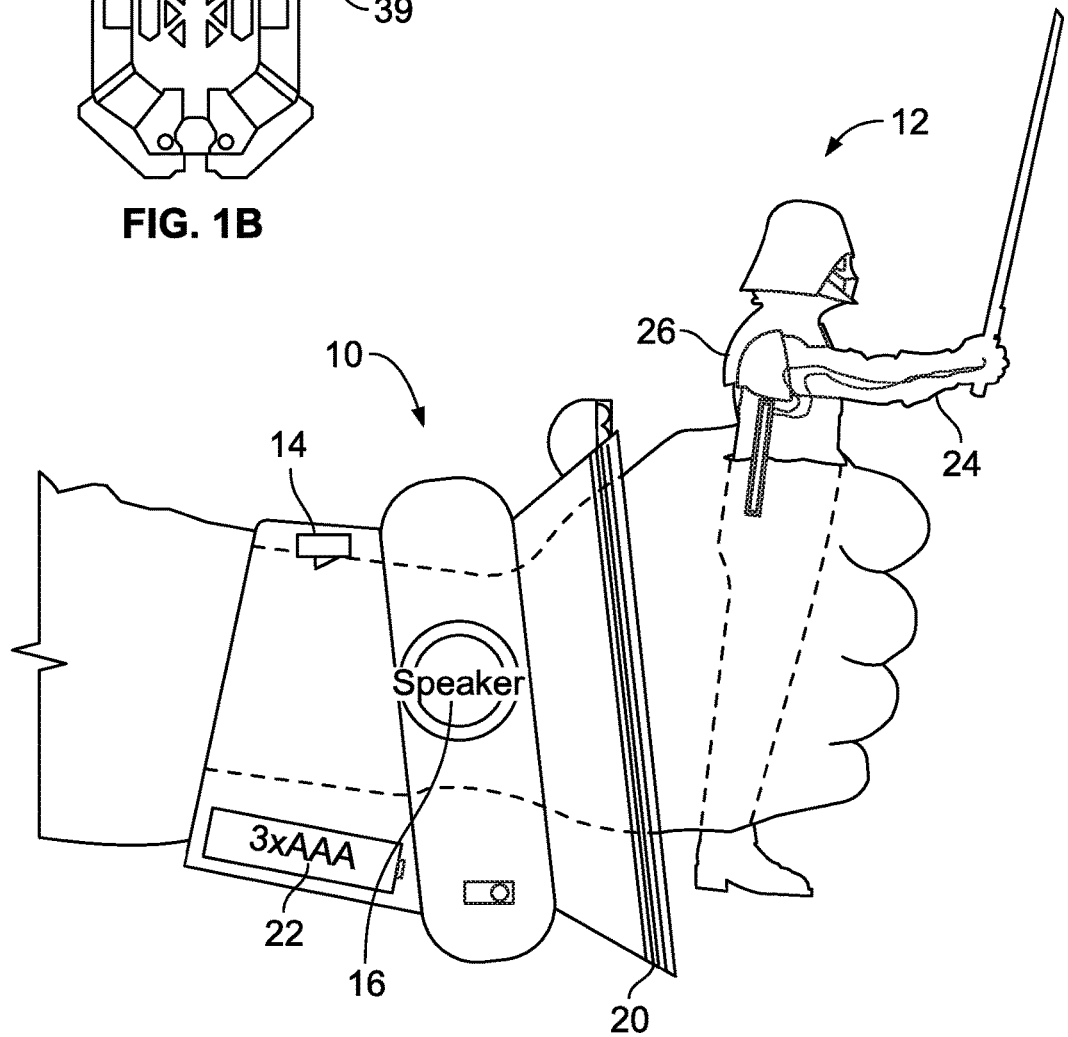
FIG. 1C

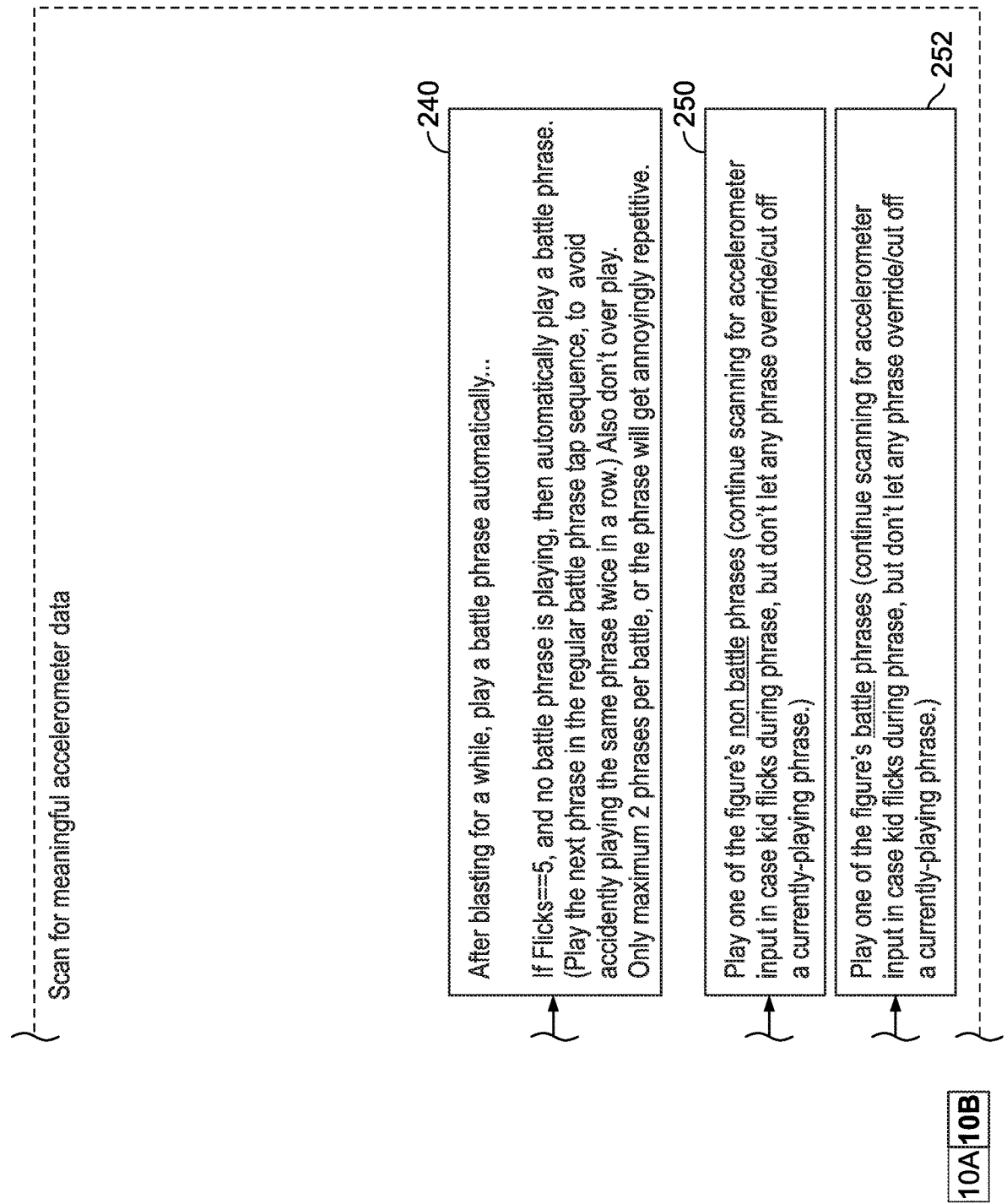

Each Igniting Figure will need:
(replace "##" with figure's identifying number)

ig##_introPhrase  ig##_nonIgnitedPhrase1
ig##_ignitedPhrase1  ig##_nonIgnitedPhrase2
ig##_ignitedPhrase2

Weapon or jetpack sounds consisting of:
ig##_ignite  ig##_sweep3
ig##_retract  ig##_flick1
ig##_idle  ig##_flick2
ig##_sweep1  ig##_flick3
ig##_sweep2

For the figure category, we will also need:
Figure_detection_good.wav
Figure_detection_evil.wav
ImperialMarch_introloop
ImperialMarch_mainloop
KylosTheme_introloop
KylosTheme_mainloop
DuelofFates_introloop
DuelofFates_mainloop
Force_Link_PowerOn (awake from sleep)
Force_Link_PowerOff (go to sleep)

Each Lunging Figure will need:
Lu##_introPhrase  Lu##_nonBattlePhrase1
Lu##_battlePhrase1  Lu##_nonBattlePhrase2
Lu##_battlePhrase2

Weapon or jetpack sounds consisting of:
Lu##_flick  Lu##_flick_multiblast

For the figure category, we will also need:
Explosion 1  Explosion 2

We will reuse the following from Igniting Figs:
Figure_detection_good.wav
Figure_detection_evil.wav

Each Creature will need:
Cr##_introSound  Cr##_tap1
Cr##_flickSound1  Cr##_tap2
Cr##_flickSound2  Cr##_tap3
Cr##_flickSound3  Cr##_tap4
Cr##_sweep1  Cr##_tap5
Cr##_sweep2  Cr##_tap6
Cr##_sweep3

For the category, we will also need:
Creature_detection.wav

Note: Not all Creatures will have six tap sounds, three sweep sounds, and three flick sounds. Depending on code architecture, you can simply call the same soundfile twice in different locations, to fill all the "slots" in the code.

Each Vehicle will need:
V##_introSound  V##_sweep1
V##_weapon  V##_sweep2
V##_quiet_idle_loop  V##_sweep3
V##_engine_running

For the category, we will also need:
Vehicle_detection

Each Backpack will need:
Bp##_introSound  Bp##_blast
Bp##_powerUp  Bp##_MegaBlast

For the category, we will also need:
Backpack_detection.wav

We will reuse the following from Lunging Figs:
Explosion 1  Explosion 2

FIG. 20

Interactive Trooper                                Scenarios and Speech

Action: WAKE UP (By pressing Belt Buckle or changing blaster/jetpack switch position)

| Blaster | Jetpack | (what happens when toy wakes from sleep) |
|---|---|---|
| x | x | (All with comm static) |
| x | ● | Reporting for duty, commander |
| ● | x | Ready for action |
| ● | ● | Trooper reporting for duty<br>[If gear attached] I've got my gear, ready to take on the rebels. |

Action: GO TO SLEEP

| Blaster | Jetpack | (what happens when toy times out to sleep) |
|---|---|---|
| x | x | Trooper standing by + power down sfx |
| x | ● | |
| ● | x | |
| ● | ● | |

Attach blaster: sfx + occasionally "All right, men, load your weapons"
Detach blaster: sfx + occasionally "Drop your weapons"

Attach backpack: sfx
Detach backpack: sfx

Action: PRESS BELT BUCKLE

| Blaster | Jetpack | (what happens when press belt buckle) |
|---|---|---|
| x | x | (The belt buckle represents trooper-to-trooper communication. Includes comm static bursts.) |
| x | ● | Orders received |
| ● | x | Mission is a go |
| ● | ● | Let's move! |

Action: FORWARD LUNGE

Hold belt button for ~1 second to power off (sfx plus "Trooper standing by")

| Blaster | Jetpack | (what happens when detect forward lunge) |
|---|---|---|
| x | x | There's one, set for stun! |
| x | ● | Move along<br>Troopers, listen up |
| ● | x | Blaster fire sfx + |
| ● | ● | Take that, you rebels!<br>The Empire will always win!<br>Right on target<br>We'll get 'em next time |

FIG. 21A

| Action: IMPACT | | |
|---|---|---|
| Blaster | Jetpack | *(what happens upon hard impact)* |
| x | x | Punch sfx<br>Several impacts in rapid succession → Fight for the Empire! <or> Lord Vader won't accept defeat To some degree, figure can tell punching from*being* *being* punched. If taking an impact, "off, ugh", etc. |
| ● | x | Punch sfx<br>Several impacts in rapid succession → Can't we just blast them?<br>(Punching when holding blaster) To some degree, figure can tell punching from *being* punched. If taking an impact, "off, ugh", etc. |
| x | ● | Oof! / Bump sfx / Scrape sfx TBD |
| ● | ● | [Occasionally] Brace for impact! I can't see anything in this helmet |

| Action: TILTING IN HORIZONTAL PLANE | | |
|---|---|---|
| Blaster | Jetpack | *(what happens when actively tilting in horizontal plane)* |
| x | x | (no reaction) |
| ● | x | |
| x | ● | If flying = Swoosh + continued flying sfx / If not flying = Start flying sfx |
| ● | ● | [Occasionally]<br>Let's take this fight to the sky     Head for the canyon<br>Rebels spotted     Aerial attack<br>Attack formation |

| Action: TURN UPSIDE DOWN | | |
|---|---|---|
| Blaster | Jetpack | *(what happens when trooper's upside down for 2 seconds)* |
| x | x | A little help here |
| ● | x | A trooper should always stay on his feet     Heads up! |
| x | ● | If flying = Swoosh + continued flying sfx / If not flying = Start flying sfx |
| ● | ● | [Occasionally]<br>For the Empire!     I've located the target     Cover me, I'm going in |

| Action: WALK A FEW STEPS | | |
|---|---|---|
| Blaster | Jetpack | *(what happens when a few sequential walking motions are detected)* |
| x | x | I need a weapon!<br>Find cover!<br>Run!! (if continued running after hearing "Run!!" play a desperate Aaaagh!! |
| ● | x | Troopers, march!     Here they come!     Advance! |
| x | ● | [Occasionally, and only once until the switch positions change; don't want to to overplay these ]<br>It's hard to run with all this equipment!<br>Jetpacks are meant for flying, not running |
| ● | ● | |

FIG. 21B

| Action: FREE FALL | | |
|---|---|---|
| Blaster | Jetpack | *(what happens when free fall is detected)* |
| x | x | Ben Burtt's "Wilhelm" scream |
| ● | x | |
| x | ● | Dive bomb sfx + continued flying sfx |
| ● | ● | |

| Action: IMPACT DURING FREE FALL | | |
|---|---|---|
| Blaster | Jetpack | *(what happens upon hard impact)* |
| x | x | Plastic armor clinks / Ughh / Oww |
| ● | x | |
| x | ● | Explosion sfx + Ughh "Equipment failure!" |
| ● | ● | |

During normal mode, LEDs are used thus:
- Neither blaster nor jetpack attached → LEDs off
- Blaster attached, jetpack detached → outer LEDs off, center LED on (red)
- Jetpack attached, blaster detached → all LEDs on (center LED appears yellow)
- Jetpack and blaster both attached → outer LEDs on (yellow), center LED on (red)

Callbacks:
- Awaiting orders, commander
- Keep moving, trooper
- The enemy's on the move
- Here they come again
- Can't be caught standing around doing nothing
- Maybe my comm link is broken
- Remain at your post, Trooper (talking to himself)

Try-Me Mode:
Press belt buckle to wake →
- "Ready for action" + all LEDs on (Motion sensor is then set to very sensitive. Picking up will usually trigger it. If triggered, it goes to standard "flying" function as described at the end of this page. Kid can fly trooper around the store aisle, still in package ☺)

If not picked up, the figure keeps encouraging kid to pick it up...
- "Let's move" (wait a couple of seconds)
- "Let's take this fight to the sky" (wait a couple of seconds)
- (outside LEDs off)
- "Awaiting orders, commander" (wait a couple of seconds)
- "Maybe my comm link is broken" (wait a couple of seconds)
- "Trooper standing by"
- LEDs off, IC sleep Once flying, it works just like normal mode (as if jetpack, but not blaster) are attached. But callbacks are bypassed, so after a few seconds of post flight inactivity, it simply says "Trooper standing by" and goes back to sleep.

FIG. 21C

| CHARACTER | FILE | SCAN RECOG. | LED | Scan Recog. File | LED |
|---|---|---|---|---|---|
| ANAKIN SKYWALKER EP 3 | ig01 | Hero | // | Figure_Detection_good | o |
| BETA 1 BLACK (Deluxe 2Pk) | ig02 | Hero | // | Figure_Detection_good | o |
| BOBA FETT EP 5 (deluxe 2Pk) | ig03 | Villain | // | Figure_Detection_evil | o |
| COOL BETA BROWN | ig04 | Hero | // | Figure_Detection_good | o |
| DARTH MAUL | ig06 | Villain | // | Figure_Detection_evil | o |
| DARTH VADER EP 5 (Vehicle) | ig07 | Villain | // | Figure_Detection_evil | o |
| DELTA 2 (BOOSTERS & GEAR) | ig08 | Hero | // | Figure_Detection_good | o |
| DELTA 3 | ig09 | Hero | // | Figure_Detection_good | o |
| EMPEROR | ig10 | Villain | // | Figure_Detection_evil | o |
| EZRA S3 | ig11 | Hero | // | Figure_Detection_good | o |
| FOXTROT 1 BROWN | ig12 | Hero | // | Figure_Detection_good | o |
| FOXTROT 1 GREY | ig13 | Hero | // | Figure_Detection_good | o |
| CHARACTER | FILE | SCAN RECOG. | LED | Battle Phrase #1 | LED |
| ANAKIN SKYWALKER EP 3 | ig01 | Hero | o | ig01_ignitedPhrase1 | o |
| BETA 1 BLACK (Deluxe 2Pk) | ig02 | Hero | o | ig02_ignitedPhrase1 | o |
| BOBA FETT EP 5 (deluxe 2Pk) | ig03 | Villain | o | ig03_ignitedPhrase1 | o |
| COOL BETA BROWN | ig04 | Hero | o | ig04_ignitedPhrase1 | o |
| DARTH MAUL | ig06 | Villain | o | ig06_ignitedPhrase1 | o |
| DARTH VADER EP 5 (Vehicle) | ig07 | Villain | o | ig07_ignitedPhrase1 | o |
| DELTA 2 (BOOSTERS & GEAR) | ig08 | Hero | o | ig08_ignitedPhrase1 | o |
| DELTA 3 | ig09 | Hero | o | ig09_ignitedPhrase1 | o |
| EMPEROR | ig10 | Villain | o | ig10_ignitedPhrase1 | o |
| EZRA S3 | ig11 | Hero | o | ig11_ignitedPhrase1 | o |
| FOXTROT 1 BROWN | ig12 | Hero | o | ig12_ignitedPhrase1 | o |
| FOXTROT 1 GREY | ig13 | Hero | o | ig13_ignitedPhrase1 | o |
| Power On .WAV file name | | | | | |
| Force_Link_PowerOn | | | | | |
| Power Off .WAV file name | | | | | |
| Force_Link_PowerOff | | | | | |
| LED LIGHTS KEY | | | | | |
| o - OFF | | | | | |
| / - ON | | | | | |
| // - 8Hz (approx) FLASH | | | | | |

*Note 1 about Boba Fett: He has a special function. Upon each tap, play a "Boba Fett Blaster" sound, followed by by 500 msec of silence, and then his phrase. He shoots every time he's tapped.

FIG. 22A

| Intro Sound File | LED | Static #1 | E | Static #2 |
|---|---|---|---|---|
| ig01_introPhrase01 | o | ig01_nonIgnitedPhrase1 | o | ig01_nonIgnitedPhrase2 |
| ig02_introPhrase01 | o | ig02_nonIgnitedPhrase1 | o | ig02_nonIgnitedPhrase2 |
| ig03_introPhrase01 | o | ig03_nonIgnitedPhrase1 | o | ig03_nonIgnitedPhrase2 |
| ig04_introPhrase01 | o | ig04_nonIgnitedPhrase1 | o | ig04_nonIgnitedPhrase2 |
| ig06_introPhrase01 | o | ig06_nonIgnitedPhrase1 | o | ig06_nonIgnitedPhrase2 |
| ig07_introPhrase01 | o | ig07_nonIgnitedPhrase1 | o | ig07_nonIgnitedPhrase2 |
| ig08_introPhrase01 | o | ig08_nonIgnitedPhrase1 | o | ig08_nonIgnitedPhrase2 |
| ig09_introPhrase01 | o | ig09_nonIgnitedPhrase1 | o | ig09_nonIgnitedPhrase2 |
| ig10_introPhrase01 | o | ig10_nonIgnitedPhrase1 | o | ig10_nonIgnitedPhrase2 |
| ig11_introPhrase01 | o | ig11_nonIgnitedPhrase1 | o | ig11_nonIgnitedPhrase2 |
| ig12_introPhrase01 | o | ig12_nonIgnitedPhrase1 | o | ig12_nonIgnitedPhrase2 |
| ig13_introPhrase01 | o | ig13_nonIgnitedPhrase1 | o | ig13_nonIgnitedPhrase2 |

| Battle Phrase #2 | LED | FLICK |
|---|---|---|
| ig01_ignitedPhrase2 | / | Lightsaber |
| ig02_ignitedPhrase2 | // | Riot Baton (sequence) |
| ig03_ignitedPhrase2 | // | BF_Rocket Booster (sequence) |
| ig04_ignitedPhrase2 | / | Lightning rod (sequence) |
| ig06_ignitedPhrase2 | / | Lightsaber (sequence) |
| ig07_ignitedPhrase2 | / | Lightsaber (sequence) |
| ig08_ignitedPhrase2 | // | R2_Rocket_Booster (sequence) |
| ig09_ignitedPhrase2 | o | Oh my! (with oh my idle) |
| ig10_ignitedPhrase2 | // | Force lightning (sequence) |
| ig11_ignitedPhrase2 | / | Lightsaber (sequence) |
| ig12_ignitedPhrase2 | / | Lightsaber (sequence) |
| ig13_ignitedPhrase2 | / | Lightsaber (sequence) |

FIG. 22B

| CHARACTER | FILE | SCAN RECOG. | LED | T2 Social - Friend Intro | LED |
|---|---|---|---|---|---|
| ANAKIN SKYWALKER EP 3 | ig01 | Hero | o | ig01_TierII_Intro_Friend | o |
| BETA 1 BLACK (Deluxe 2Pk) | ig02 | Hero | o | ig02_TierII_Intro_Friend | o |
| BOBA FETT EP 5 (deluxe 2Pk) | ig03 | Villain | o | ig03_TierII_Intro_Friend | o |
| COOL BETA BROWN | ig04 | Hero | o | ig04_TierII_Intro_Friend | o |
| DARTH MAUL | ig06 | Villain | o | ig06_TierII_Intro_Friend | o |
| DARTH VADER EP 5 (Vehicle) | ig07 | Villain | o | ig07_TierII_Intro_Friend | o |
| DELTA 2 (BOOSTERS & GEAR) | ig08 | Hero | o | ig08_TierII_Intro_Friend | o |
| DELTA 3 | ig09 | Hero | o | ig09_TierII_Intro_Friend | o |
| EMPEROR | ig10 | Villain | o | ig10_TierII_Intro_Friend | o |
| EZRA S3 | ig11 | Hero | o | ig11_TierII_Intro_Friend | o |
| FOXTROT 1 BROWN | ig12 | Hero | o | ig12_TierII_Intro_Friend | o |
| FOXTROT 1 GREY | ig13 | Hero | o | ig13_TierII_Intro_Friend | o |

FIG. 22C

| T2 Social - Foe Intro | LED | T2 Social - Friend Reply | LED | T2 Social - Foe Reply |
|---|---|---|---|---|
| ig01_TierII_Intro_Foe | o | ig01_TierII_Reply_Friend | o | ig01_TierII_Reply_Foe |
| ig02_TierII_Intro_Foe | o | ig02_TierII_Reply_Friend | o | ig02_TierII_Reply_Foe |
| ig03_TierII_Intro_Foe | o | ig03_TierII_Reply_Friend | o | ig03_TierII_Reply_Foe |
| ig04_TierII_Intro_Foe | o | ig04_TierII_Reply_Friend | o | ig04_TierII_Reply_Foe |
| ig06_TierII_Intro_Foe | o | ig06_TierII_Reply_Friend | o | ig06_TierII_Reply_Foe |
| ig07_TierII_Intro_Foe | o | ig07_TierII_Reply_Friend | o | ig07_TierII_Reply_Foe |
| ig08_TierII_Intro_Foe | o | ig08_TierII_Reply_Friend | o | ig08_TierII_Reply_Foe |
| ig09_TierII_Intro_Foe | o | ig09_TierII_Reply_Friend | o | ig09_TierII_Reply_Foe |
| ig10_TierII_Intro_Foe | o | ig10_TierII_Reply_Friend | o | ig10_TierII_Reply_Foe |
| ig11_TierII_Intro_Foe | o | ig11_TierII_Reply_Friend | o | ig11_TierII_Reply_Foe |
| ig12_TierII_Intro_Foe | o | ig12_TierII_Reply_Friend | o | ig12_TierII_Reply_Foe |
| ig13_TierII_Intro_Foe | o | ig13_TierII_Reply_Friend | o | ig13_TierII_Reply_Foe |

FIG. 22D

| 22A | 22B |
|---|---|
| 22C | 22D |

| | SCAN FILE | RECOG | LED | Scan Recog File | LED | Intro Sound File |
|---|---|---|---|---|---|---|
| CHARACTER | | | | | | |
| PROBE DROID* | cr01 | Vehicle | // | Vehicle_Detection | o | cr01_IntroSound |
| RATHTAR | cr02 | Villain | // | Figure_Detection_evil | o | cr02_IntroSound |
| HOOF | cr03 | Hero | // | Figure_Detection_good | o | cr03_IntroSound |
| ZULU* | cr04 | Vehicle | // | Vehicle_Detection | o | cr04_IntroSound |
| CHARACTER | SCAN FILE | RECOG | LED | Scan Recog File | LED | Intro Sound File |
| AERO 1 | V01 | Vehicle | // | Vehicle_Detection | o | V01_IntroSound |
| CARVER | V02 | Vehicle | // | Vehicle_Detection | o | V02_IntroSound |
| TANGO NEON SPEEDER | V03 | Vehicle | // | Vehicle_Detection | o | V03_IntroSound |
| VICTOR 1'S ECHO | V04 | Vehicle | // | Vehicle_Detection | o | V04_IntroSound |
| BETA 2'S XRAY | V05 | Vehicle | // | Vehicle_Detection | o | V05_IntroSound |
| EP 7 TIE FIGHTER** | V06 | Vehicle | // | Vehicle_Detection | o | V06_IntroSound |
| ACCESSORY | SCAN FILE | RECOG | LED | Scan Recog File | LED | Intro Sound File |
| BOBA FETT EP 5 Dlx Acc. | Bp01 | Vehicle | // | Backpack_detection | // | Bp01_IntroSound |
| FOXTROT 1 GREY Dlx Acc. | Bp02 | Vehicle | // | Backpack_detection | // | Bp02_IntroSound |
| GENERAL GRIEVOUS Dlx Acc. | Bp03 | Vehicle | // | Backpack_detection | // | Bp03_IntroSound |
| SEAL WEAPON Dlx Acc. | Bp04 | Vehicle | // | Backpack_detection | // | Bp04_IntroSound |
| TANGO LEADER Dlx Acc. | Bp05 | Vehicle | // | Backpack_detection | // | Bp05_IntroSound |
| Power On .WAV file name | | | | | | |
| Force_Link_PowerOn | | | | | | |
| Power Off .WAV file name | | | | | | |
| Force_Link_PowerOff | | | | | | |
| LED LIGHTS KEY | | | | | | |
| o - OFF | | | | | | |
| / - ON | | | | | | |
| // - 7 Hz (approx) FLASH | | | | | | |

* The Probe Droid and Zulu (mechanical characters) are in fact creatures (for game play). They use vehicle recognition sounds; that's not a typo. And their "tap" should be on a different audio channel, so it can happen simultaneously with other sfx.
** Special Forces Tie uses the same sounds as Victor 1 Echo, except for the intro sound

FIG. 23A

| 23A | 23B |

| LED | Sweep | LED | Static + Tap | LED | Flick |
|---|---|---|---|---|---|
| / | cr01_sweep1/2 | // | cr01_tap1/2 | // | cr01_flick1 |
| / | cr02_sweep1/2/3 | // | cr02_tap1/2 | // | cr02_flick1/2/3/4 |
| / | cr03_sweep1/2/3 | // | cr03_tap1 | // | cr03_flick1/2/3 |
| / | cr04_sweep1 | // | cr04_tap1 | // | cr04_flick1 |

| LED | Sweep | LED | Static + Tap | LED | Static |
|---|---|---|---|---|---|
| / | V01_sweep1/2/3 + V01_engine running | // | V01_Weapon | o | V01_quiet idle (loop) |
| / | V02_sweep1/2/3 + V02_engine running | // | V02_Weapon | o | V02_quiet idle (loop) |
| / | V03_sweep1/2/3 + V03_engine running | // | V03_Weapon | o | V03_quiet idle (loop) |
| / | V04_sweep1/2/3 + V04_engine running | // | V04_Weapon | o | V04_quiet idle (loop) |
| / | V05_sweep1/2/3 + V05_engine running | // | V05_weapon | o | V05_quiet idle (loop) |
| / | V04_sweep1/2/3 + V04_engine running | // | V04_Weapon | o | V04_quiet idle (loop) |

| LED | Flick after Tap | LED | Tap | LED | Flick | LED | Holster/Retract |
|---|---|---|---|---|---|---|---|
| /// | Bp01_FlickAfterTap | // | Bp01_Tap | // | Bp01_Flick | // | Bp01_holster |
| X | Bp02_FlickAfterTap | // | Bp02_Tap | // | Bp02_Flick | // | Bp02_holster |
| /// | Bp03_FlickAfterTap | // | Bp03_Tap | // | Bp03_Flick | // | Bp03_holster |
| /// | Bp04_FlickAfterTap | // | Bp04_Tap | // | Bp04_Flick | // | Bp04_holster |
| X | Bp05_FlickAfterTap | // | Bp05_Tap | // | Bp05_Flick | // | Bp05_holster |

FIG. 23B

| 23A | 23B |

| | .wav File Name |
|---|---|
| Athena | |
| Well Han, some one had to stay behind and finish the job. | Athena_hello_to_Zeus |
| nothing like a sense of urgency for you Han | Athena_response1_to_Zeus |
| Out of curiosity, do you ever stop talking? | Athena_response2_to_Zeus |
| You're putting us all at risk with your reckless actions! | Athena_statement1_to_Zeus |
| Listen wise guy, you don't seem to use your head too much do you? | Athena_statement2_to_Zeus |
| Hermes (Iu50) | |
| Han Solo? I don't believe we've had the pleasure | Iu50_hello_to_Zeus |
| I guess I'm just not as reckless as you | Iu50_response1_to_Zeus |
| Ha, you can follow the smuggler, I actually know where we're going. | Iu50_response2_to_Zeus |
| What are you doing to my ship?? | Iu50_statement1_to_Zeus |
| Han, you're a double-crossing, no-good swindler | Iu50_statement2_to_Zeus |
| Chronos (Iu46) | |
| *agitated greeting...* | Iu46_hello_to_Zeus |
| *Furious snarl* | Iu46_response1_to_Zeus |
| *ferocious hiss* | Iu46_response2_to_Zeus |
| *angrily snapping orders* | Iu46_statement1_to_Zeus |
| *shouting uncontrollably* | Iu46_statement2_to_Zeus |
| Artemis (Iu41) | |
| Han Solo, you've got spirit kid | Iu41_hello_to_Zeus |
| Let's go, you're coming with us. | Iu41_response1_to_Zeus |
| keep your head down! We're trying not to be seen! | Iu41_response2_to_Zeus |
| take it easy kid, you're still a rookie at this. | Iu41_statement1_to_Zeus |
| Do you even think before you speak? | Iu41_statement2_to_Zeus |
| Hades (Iu61) | |
| Han Solo, Qi'ra has filled me in on your various campaigns | Iu61_hello_to_Zeus |
| Snarl-smirk, good to see what little reputation you have doesn't disappoint | Iu61_response1_to_Zeus |
| Those details, are well above your pay grade | Iu61_response2_to_Zeus |
| it would be wise to listen to your commander and keep quiet | Iu61_statement1_to_Zeus |
| You've got a bit of a sharp tongue on you boy | Iu61_statement2_to_Zeus |

| 24A | 24B |
|---|---|
| 24C | 24D |

FIG. 24B

| Hercules (Iu62) | |
|---|---|
| Introductory roar | Iu62_hello_to_Zeus |
| Acknowledgment roar | Iu62_response1_to_Zeus |
| Snarl / laughter | Iu62_response2_to_Zeus |
| Concerned chatter | Iu62_statement1_to_Zeus |
| Wookie laugh | Iu62_statement2_to_Zeus |
| Nemesis (Iu54) | |
| You are of no concern to me. | Iu54_hello_to_Zeus |
| my Marauders are a force to be reckoned with.... | Iu54_response1_to_Zeus |
| (*snarl), my ripper thinks differently... | Iu54_response2_to_Zeus |
| Silence! I will not have any further exchange with you Solo | Iu54_statement1_to_Zeus |
| That was the wrong move you scum! | Iu54_statement2_to_Zeus |

FIG. 24D

MOTION AND TOY DETECTING BODY ATTACHMENT

PRIORITY CROSS-REFERENCE TO RELATED APPLICATION

This application claims priority pursuant to 35 U.S.C. 119(e) from U.S. Provisional Patent Application, No. 62/433,728 filed on Dec. 13, 2016.

FIELD OF THE INVENTION

The present invention relates generally to interactive toys, and more particularly to a motion detecting body attachment, such as a bracelet, that detects and identifies a toy figure, such as a character or a vehicle, and that provides sensory output in response to toy figure identification and body attachment motion near the toy figure.

BACKGROUND OF THE INVENTION

Toys that provide sensory output in response to human-toy interaction are ubiquitous and exist in both simple and complicated forms. For example, a squeaky rubber duck is a very popular toy with a simple design that responds with an audible squeak when squeezed. On the other hand, the game Simon™, presently released by Hasbro™, provides for more complicated human-toy interaction by presenting an increasingly long visual sequence of colored lights through four different colored translucent buttons, respectively, where, after each visual sequence, the player must repeat the sequence by pressing the colored button corresponding to each light in the sequence and where the game ends when the player pushes an incorrect button when trying to recreate the sequence.

Also common are toys, such as characters and vehicles, used for fantasy play. For example, G.I. Joe™ toys by Hasbro™ include military characters, vehicles and weapons for one to create an imaginary battle by holding and moving the characters, vehicles, and weapons, often accompanying the movement with the player mimicking the sounds of soldiers, military vehicles, and weapons. Similarly, more recent toys have been based on Star Wars™, which includes a great story line for fantasy play with related characters, vehicles, and weapons.

The prior art further includes toys that make relevant sounds during interaction either to accompany or to replace the player's mimicking. For example, sound has been coupled to motion. U.S. Pat. No. 5,920,024 to Moore for "Apparatus and Method for Coupling Sound to Motion" discloses "a motion-to-sound apparatus which provides for musical scores and accompaniments, and lyrics and in response to a movement in three-dimensional space along more than one plane. Further disclosed is a motion-to-sound apparatus for producing sounds responsive both to the final position, or direction of movement, of the detector in space and the acceleration of the device towards that position or along that plane."

For vehicle play, U.S. Pat. No. 4,946,416 to Stern, et al. for "Vehicle with Electronic Sounder and Direction Sensor" discloses a "toy wheeled vehicle such as a toy truck which is intended to be pushed along by a child [that] includes electronic circuitry which is capable of emitting a plurality of different sounds similar to the sounds of a real truck. The actual sound of a truck's internal combustion engine is digitized and stored in a microprocessor along with other sounds such as those generated by a starter motor, horn, backup beeper and the like." Similarly, U.S. Pat. No. 5,195,920 to Collier for "Radio Controlled Model Vehicle Having Coordinated Sound Effects System" discloses "a self-contained sound effects system for a model radio controlled toy vehicle. The conventional internal control signals of the vehicle are detected . . . and are utilized to generate realistic sound effects on board the vehicle. The sound data and programming necessary to coordinate the realistic sound effects with the conventional on-board control signals are entirely contained on the vehicle."

For weapon play, U.S. Pat. No. 6,150,947 to Shima for "Programmable Motion-Sensitive Sound Effects Device" discloses a "programmable sound effects device which utilizes a motion-sensitive mechanism for selecting unique sound effects. The device is comprised of an electronic motion-sensitive actuator, a sound effect storage media for storing a plurality of predetermined sound effects, and a playback mechanism for audibly emitting the motion-activated sound effects. This device is designed to be used with amusement and entertainment type products such as toys, games, dolls, and props, with exemplary uses in toy swords, drumsticks, magic wands, and the like. A preferred embodiment is comprised of a unit which is physically incorporated into the handle of a toy sword. As the user moves the toy sword in a predefined manner, the motion-sensitive actuator senses the motion and plays out a plurality of unique sound effects as a function of the user's movements. The motion-detection algorithm which triggers the different sound effects is programmable. In another embodiment, the device is contained within a single housing unit that is worn on the user's body. This embodiment is well suited for many toys, props, games, and the like that do not have any sound effects capability but would benefit from such capability."

Additionally, U.S. Pat. No. 7,247,097 to Woolston for "Electronic Sword Game with Input and Feedback" discloses an "electro-mechanical device for providing an input to a computer program and said computer program providing a tactile output through said electro-mechanical device to a user. More specifically, . . . an electro-mechanical virtual sword game apparatus . . . receives positional information from sensors on the sword apparatus and the sword apparatus contains a propulsion gyrostat that under the control of a computer process may be topple (sic) to provide a torque on the housing of the sword apparatus that may be used to simulate the impact of sword blows."

Similarly, fantasy play is exemplified by U.S. Pat. No. 6,626,728 to Holt for "Motion-Sequence Activated Toy Wand", which discloses a "toy wand that is activated and controlled by a sequence of motions of the wand while in the hand of an operator. When moved through a specific sequence of motions (herein termed a 'spell', the wand will produce an appealing display of lights whose purpose is to amuse or entertain the wand operator or others in the viewing area. The toy wand comprises a casing, a means for detecting a sequence of motions, one or more lights, and a means for providing time-varying illumination from the lights as a function of the history of motions of the wand."

Additional prior art combines sound effects with clothing. For example, International Patent Application WO 96/04053 by Yanofsky for "Sound Generating Toy Glove" discloses a glove with a sound generator and at least one switch for producing a signal activating the sound generator, where, in one embodiment, the sound generator is an electric sound chip playing back digitized sound stored in a non-volatile memory, and different sounds are produced in response to depressing different switches indicative of a position of the glove.

Despite the above-described prior art, the use of responsive sensory output in human-toy interaction has been limited. It would be advantageous to enhance the enjoyment of human-toy interaction by providing an interactive toy with a motion detecting body attachment that detects and identifies a toy figure and that provides sensory output in response to toy figure identification and body attachment motion near the toy figure. Accordingly, it would be desirable to provide an embodiment with a body attachment, such as a bracelet, that recognizes a proximate toy figure, such as a character or a vehicle, and that emits sounds related to the proximate toy figure from the body attachment. This can be accomplished by using Near Field Communication (NFC) or other similar communications means to recognize a toy figure, such as a character or vehicle, using a motion sensing body attachment that identifies the toy figure and associates the toy figure with sensed body attachment movement and that emits a sound from the body attachment related to the movement and the toy figure via a data structure query. The data structure is stored as a comprehensive matrix that accounts for many figures, such as action figures or vehicles, and many sounds associated with the action figures and the vehicles. The inventions discussed in connection with the described embodiments address these and other deficiencies of the prior art.

The features and advantages of the present inventions will be explained in or apparent from the following description of the preferred embodiment considered together with the accompanying drawings.

SUMMARY OF THE INVENTION

The present inventions address the deficiencies of the prior art by defining a body attachment used in combination with a toy figure, where the body attachment, when attached to a player's body, detects and recognizes specific motions, and, when in proximity to the toy figure, detects and recognizes the identity of the toy figure. The body attachment then queries a database with the toy figure identity and recognized motion and produces sensory detectible outputs. The database is stored as a comprehensive matrix that accounts for many figures, such as action figures or vehicles, and many sounds associated with the action figures and the vehicles.

An exemplary body attachment includes a cuff-like glove that attaches to a player's wrist and that resembles part of a battle uniform, for example, from a Star Wars™ character. An exemplary toy figure includes a Star Wars character holding a light saber and scaled for handheld use during simulated battles where the body attachment produces sensory output related to the toy character. The light saber may or may not use LEDs to illuminate them. Thus, other exemplary figures will have a non-illuminating saber. Additionally, exemplary vehicles may have illuminated engines or other parts.

The described embodiment, also known as the Force Link, includes an accelerometer, an RF antenna, and a master chip (plus speaker and batteries). The Force Link communicates with a circuit in an action figure via RFID tag. The RFID tag provides information to identify the action figure. The Force Link reads the tag identity via a known 13.56 MHz RFID method. Acceleration data of a player's arm movement is reported to the master chip by accelerometer. Based on observed data points from the accelerometer, and thus the figure, since the hand with Force Link is holding the figure, the master chip selects particular pre-programmed sounds relating to the figure's acceleration when the accelerometer data matches pre-programmed criteria. The master chip in a described embodiment may be an ARM Cortex M0 chip or in another described embodiment may be an 8-bit master chip that communicates with the accelerometer via a serial peripheral interface (SPI).

The described system is heuristic in that the engineer/programmer observed output of the accelerometer and then preprogrammed the master chip to play certain sounds when pre-programmed data points are obtained from real-time play. There is no signal processing to calculate a numerical value that is a function of acceleration in two axes and the selection of sounds based upon the calculated numerical values. Signal processing is generally understood to mean some form of continuous or summed proportional manipulation of a signal, such that the output is a function of the input. With this system the output is not a function of accelerometer data, but rather a result of the input plus a second set of determining factors, like sequential or pseudo-random routines from within the master processor's code itself. For example, the input may include accelerometer data that matches the pre-programmed data points, and the determining factors may include, but not be limited to, the toy figure that the player holds, the number of times the recognized motion has already been recognized during a play sequence, the sequence of player movements, etc.

Most of the played sounds are part of a sequence, so that acceleration data which matches a particular set of criteria often generates different responses during the sequence. The first instance of recognized acceleration may play a blaster sound effect, the subsequent instance may play a blaster plus explosion sound effects. When the explosion played has only to do with the code sequences—i.e., maybe it happens every 3rd time, and often has nothing to do with received acceleration data. That behavior disqualifies the sound effects as a function of accelerometer data. That is, the sound effects played are independent of the raw accelerometer data because those sound effects are based on the developer's heuristic data, which recognizes a motion, and the prior sequence of character movement and sounds.

BRIEF DESCRIPTION OF THE DRAWINGS

The inventions will now be more particularly described by way of example with reference to the accompanying drawings, the advantages of which may be best understood with reference to the following detailed description taken in conjunction with the drawings, in which:

FIG. 1B shows a wristlet as a body attachment.

FIG. 1C shows a cuff-like glove as a body attachment and a Star Wars™ character as a toy figure.

FIG. 1D shows the circuit inside the toy figure.

FIGS. 10A and 10B show a flow chart describing lunging toy action figure behavior.

FIG. 20 provides a columnar chart of the sounds needed in the described embodiment for igniting figures, lunging figures, creatures, vehicles, and backpacks.

FIGS. 21A, 21B and 21C show various scenarios with speech and lights described above for an interactive trooper in a tabular format with explanations.

FIGS. 22A, 22B, 22C and 22D illustrate the database table used for sound effects and speech related to the various action figure characters, vehicles and accessories.

FIGS. 23A and 23B illustrate the database matrix used for sound effects and speech related to the various action figure playsets.

FIGS. 24A, 24B, 24C and 24D illustrate the database table used for social play sound effects and speech related to the various paired action figure creatures communications.

Figure 1:
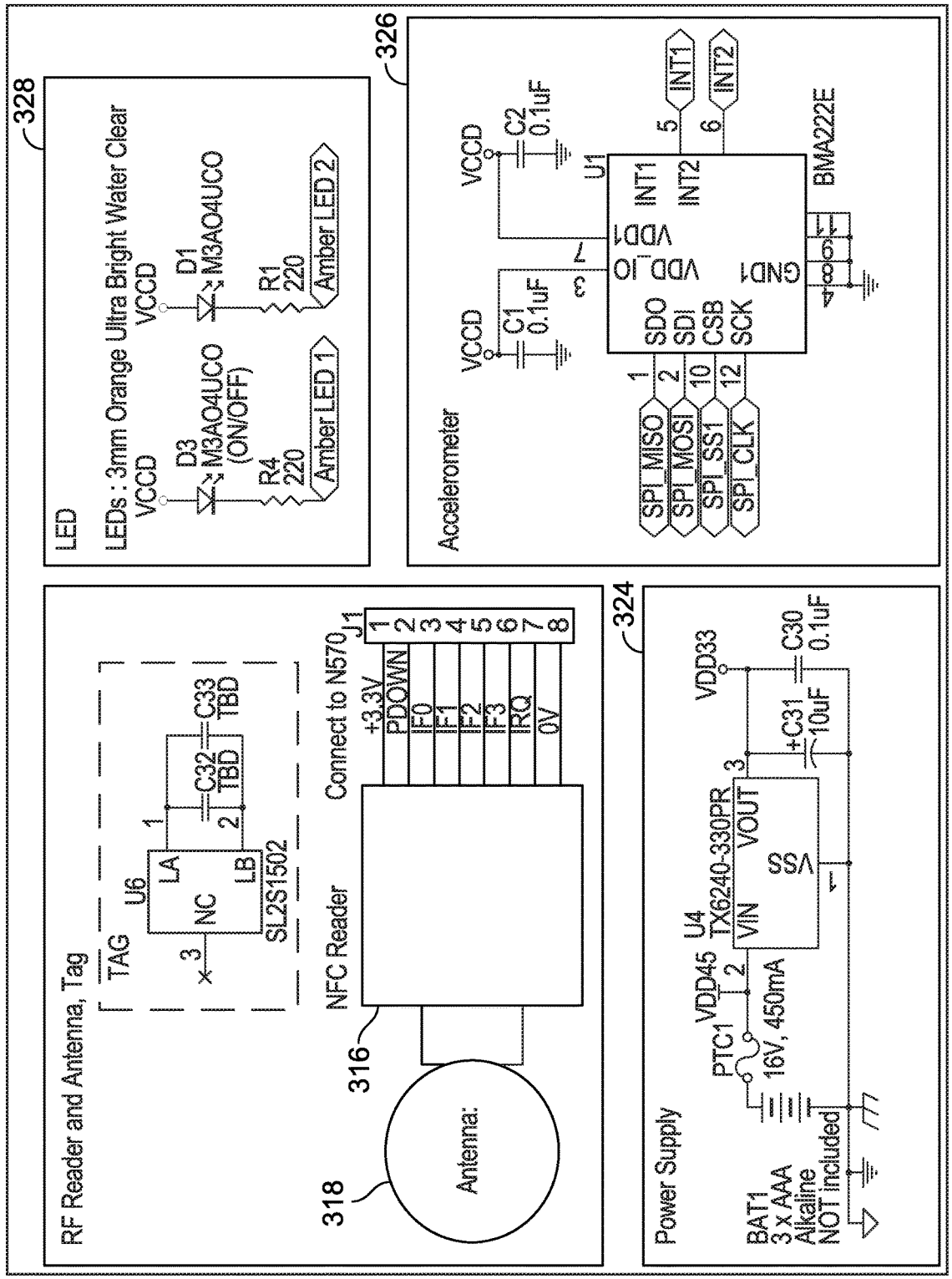
FIGS. 1 and 1A show a schematic of a body attachment in a described embodiment.

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

DETAILED DESCRIPTION OF THE EMBODIMENTS

Figure 1A:
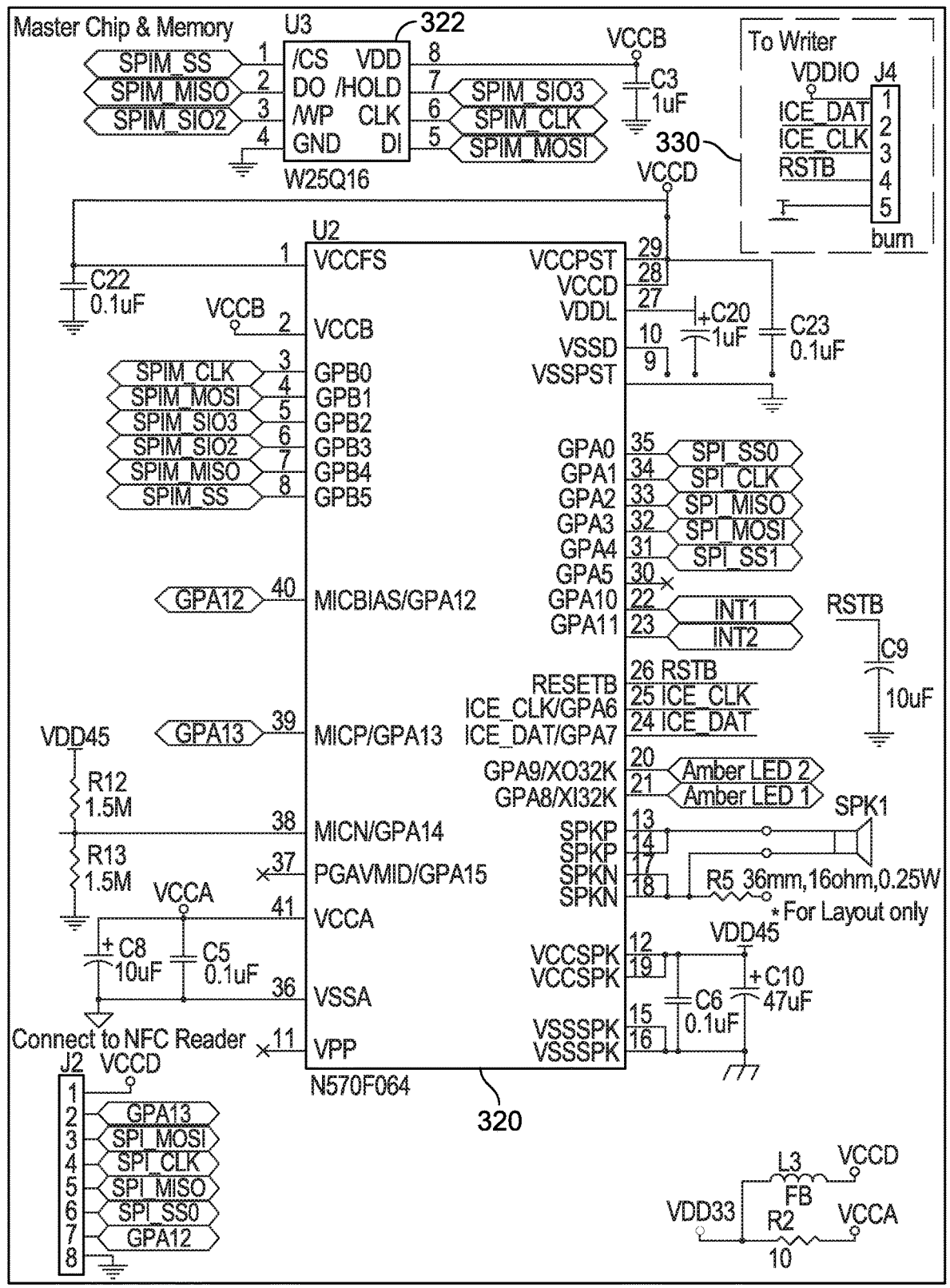

Described embodiments include two main components, a body attachment and a toy figure. FIGS. 1 and 1A shows a schematic of a body attachment in a described embodiment. FIGS. 1 and 1A, in part, shows a schematic of an NFC reader 316 and an antenna 318. In a described embodiment, the NFC reader 316 is an NXP-brand reader chip that handles NFC communication protocol, though using other chips is possible. This chip reports events, such as tags read, back to the master chip. FIGS. 1 and 1A also shows a custom antenna 318 for working with the matching network by the NXP reader chip. This optimizes performance while ensuring FCC compliance. The antenna 318 is fairly typical with five coils of copper insulated wire, though other antennae are possible. In some embodiments, a PCB antenna may be used if less variability is desired during mass production.

FIGS. 1 and 1A, in part, also shows a schematic of a master chip 320 and memory 322. The master chip 320 shown is an N570 ARM Cortex M0 processor, the heart of the system. Other master chips are possible. This master chip 320 runs the program from flash memory 322, configures the NFC reader 316 IC and accelerometer 326, gets constant XYZ g-force data from accelerometer 326, watches for accelerometer 326 interrupts, watches for tag-read information from NFC reader 316 IC, operates tag data "hysteresis" to provide glitch-free operation as the consumer sees it (i.e., if a tag momentarily drops out of range, still pretends the tag is present for a short time, just in case the tag dropped out of range for a short moment only), operates LEDs 328, and plays sounds along with having other capabilities. The toy object contains one or more switches to alter tag data.

The flash memory 322 will contain the master program, which will execute the system programs, and contain all the sound data in the product content matrix, including a plurality of sound files. The program is run by the N570 master chip 320.

FIGS. 1 and 1A, in part, shows a schematic of a power supply 324. This is a typical power supply. FIGS. 1 and 1A, in part, further shows a schematic of an accelerometer 326. The accelerometer 326 senses and reports g-forces in three axes to the master chip. The accelerometer 326 also has built-in "interrupt engines" which one can program to watch for certain events, such as an impact above a threshold of one's choosing. The schematics in FIGS. 1 and 1A lastly show a schematic of LEDs 328 and a schematic of an IR transmitter 330.

FIG. 1B shows a wristlet as a body attachment 36. The wristlet body attachment 36 attaches to the player's wrist using a wristband 38. The wristband 38 is connected to the main housing 39, which contains an accelerometer to detect motion of the body attachment 36 so that it may play different speech or sound effects through the speaker 42, which is below the hinge 47, depending on the motion of the body attachment 36 (and the identity of a toy figure). An NFC reader loop antenna 44 is attached inside an antenna housing 46 so that it may rest on the back of a player's hand and swivel on a hinge and be used to read an RFID tag from a toy figure.

Figure 12:
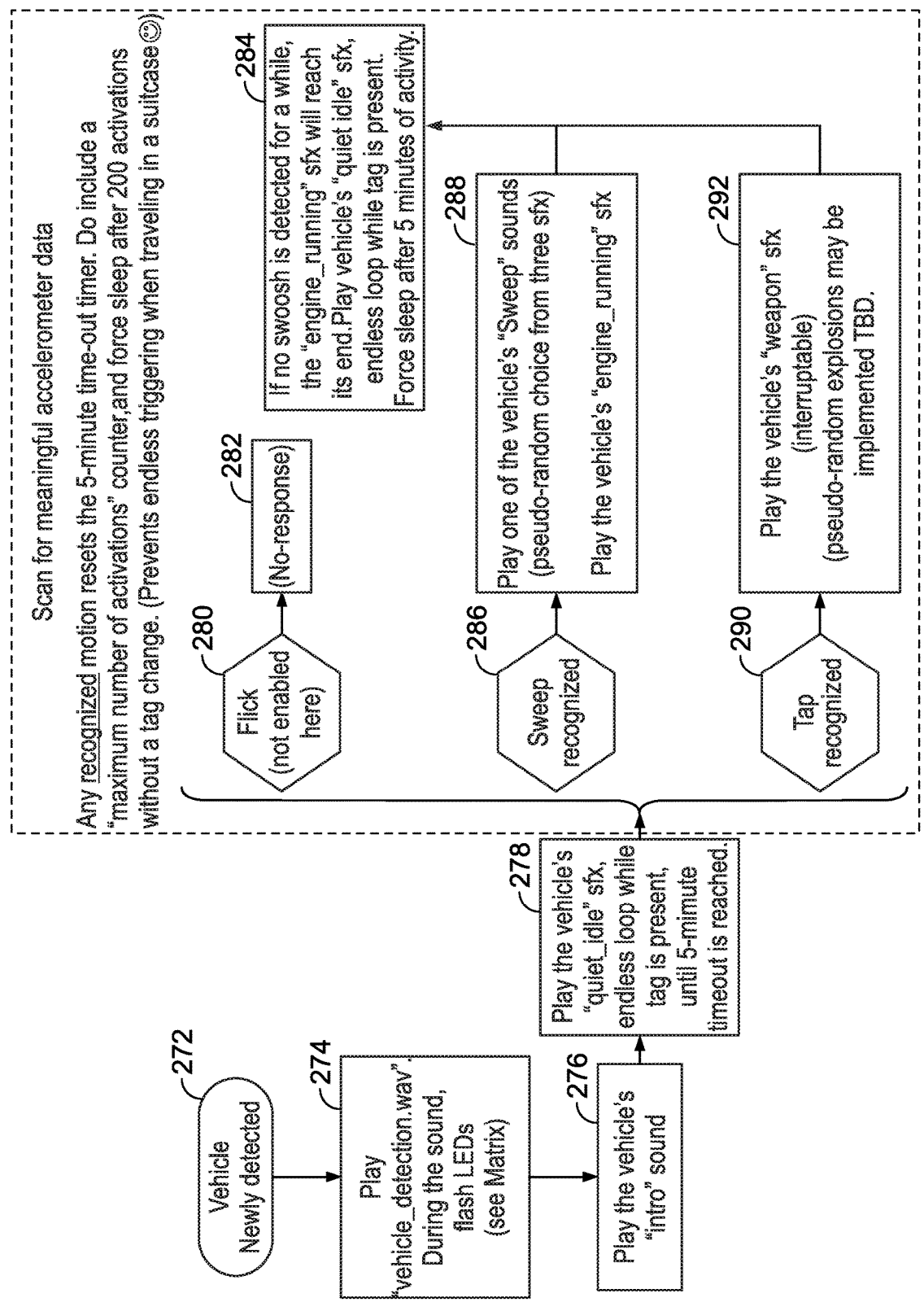
FIG. 12 shows a flow chart describing vehicle toy action figure behavior.

FIG. 1C shows a cuff-like glove as a body attachment 10 and a Star Wars™ character as a toy FIG. 12, i.e., one of a plurality of play objects selected from the group consisting of toy figure, toy vehicle, and toy accessory objects. The cuff-like glove body attachment 10 is made to detect and identify the Star Wars™ character toy FIG. 12 and respond according to the identity of the Star Wars™ character toy FIG. 12 and the motion of the cuff-like glove body attachment 10. The microswitch 14 detects when a player puts on the cuff-like glove body attachment 10. When the microswitch 14 detects the player's arm, an application running within the cuff-like glove body attachment 10 awakens and plays different speech or sound effects through the speaker 16 depending on the identity of the toy FIG. 12 and the position of the toy figure's arm 24. For example, the toy figure's arm 24 in an up position will signify battle readiness and cause one sound effect from the speaker 16 when the cuff-like glove body attachment 10 recognizes the toy FIG. 12, and the toy figure's arm 24 in a down position will cause a different sound effect from the speaker 16 when the cuff-like glove body attachment 10 recognizes the toy FIG. 12 as between upward and downward orientations and the like. This occurs because a 2-pole microswitch 26 detects the position of the toy figure's arm 24 and identifies the toy FIG. 12 differently. Additionally, though not shown, in some embodiments, an LED may further be attached to the toy figure's arm 24 and may light if the toy figure's arm 24 is up and may stay unlit if the toy figure's arm 24 is down. In the described embodiment, the toy FIG. 12 is approximately 3.75 inches, although many different sizes may be used.

A described embodiment may include several different toy figures and several phrases and sound effects per figure. An accelerometer in the cuff-like glove body attachment 10 is used to detect the motion of the body attachment 10 so that it may play different speech or sound effects depending on the motion of the body attachment 10 and the identity of the toy FIG. 12. Each toy FIG. 12 contains a circuit with an RFID tag that uniquely identifies the toy FIG. 12. The body attachment 10 uses an RFID or NFC reader loop antenna 20 to read the RFID tag that uniquely identifies the toy FIG. 12. The body attachment includes a battery compartment so that batteries may supply power.

FIG. 1D shows the circuit inside the toy FIG. 12 from FIG. 1C). The RFID tag 30 provides power to the LED 32, which may appear in some embodiments. A 2-pole microswitch 34 is connected between the RFID tag 30 and the LED 32 so that both poles of the 2-pole microswitch 34 are open when the arm of the toy figure is down and both poles of the 2-pole microswitch 34 are closed when the arm of the toy figure is up. Thus, pole 1 connects the LED 32 when the arm is up and disconnects the LED 32 when the arm is down; and pole 2 disconnects one bit of the RFID tag 30 identification bits when the arm is down and connects the bit of the RFID tag 30 when the arm is up. Therefore, the figure transmits one unique ID for the toy character with the arm up and a different unique ID with the arm down. For example, if twelve different characters are used, there must be twelve unique "arm up" IDs and twelve unique "arm down" IDs. This may not appear in all embodiments.

Figure 2:
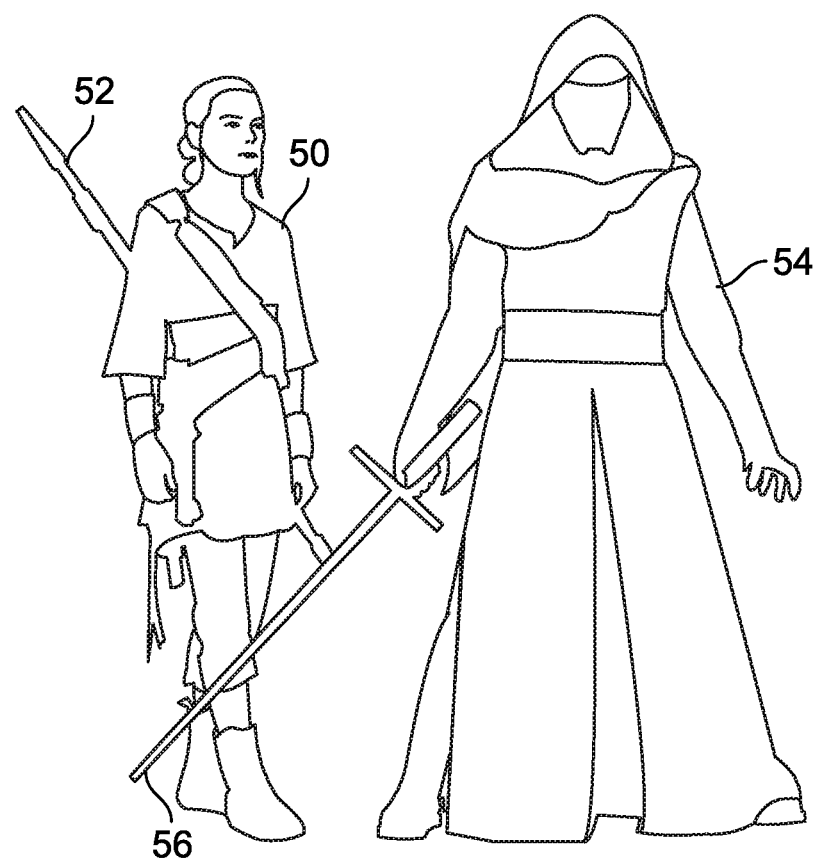
FIG. 2 shows two characters used as toy figures.

FIG. 2 shows two characters used as toy figures. The first figure, a female warrior 50 named "Foxtrot 1", appears mainly gray and may be made to feature a poncho that will fit over the female warrior 50 figure as a single piece without affecting figure articulation. In the described embodiment, the female warrior 50 figure may also carry a blue light saber 52 that will operate based on figure arm position. The second figure, a cloaked warrior 54 named "Victor 1", appears mainly black and may be made to feature a PVC upper shawl that will fit over the cloaked warrior 54 figure as a single piece without affecting figure articulation. In the described embodiment, the cloaked warrior 54 figure may also carry a red light saber 56 that will operate based on figure arm position. Some of the defined embodiments will not identify the arm position and will emit the same sounds regardless of the arm position.

Figure 3:
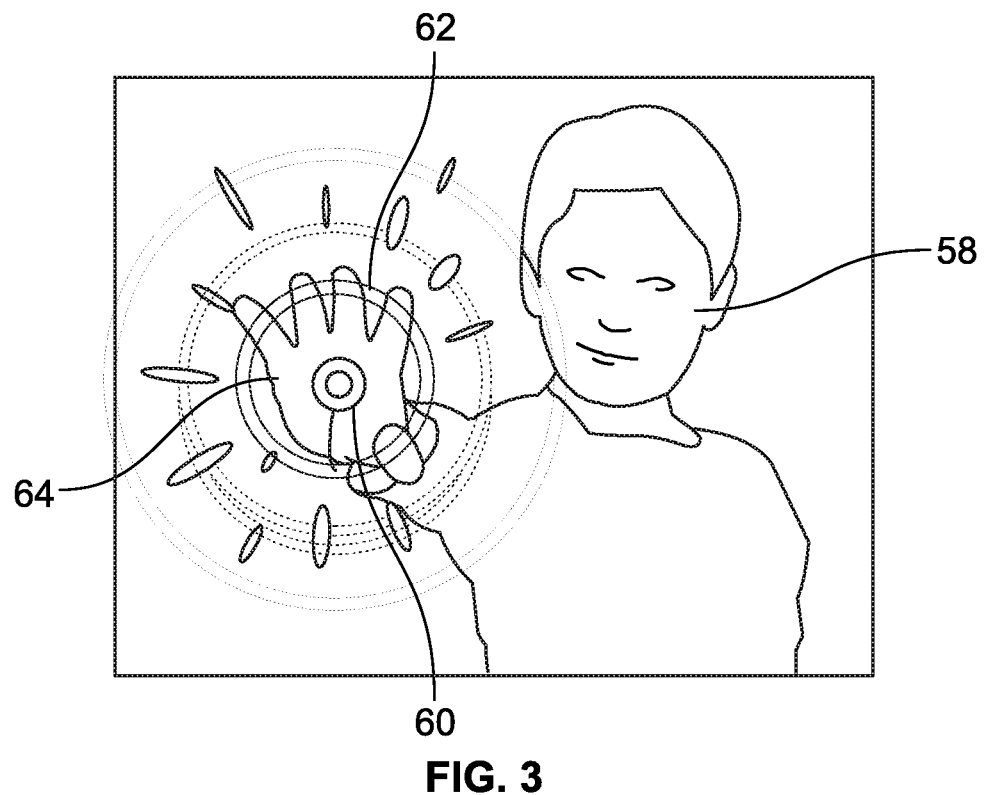
FIG. 3 shows the RFID reader loop antenna as a body attachment in use.
Figure 4:
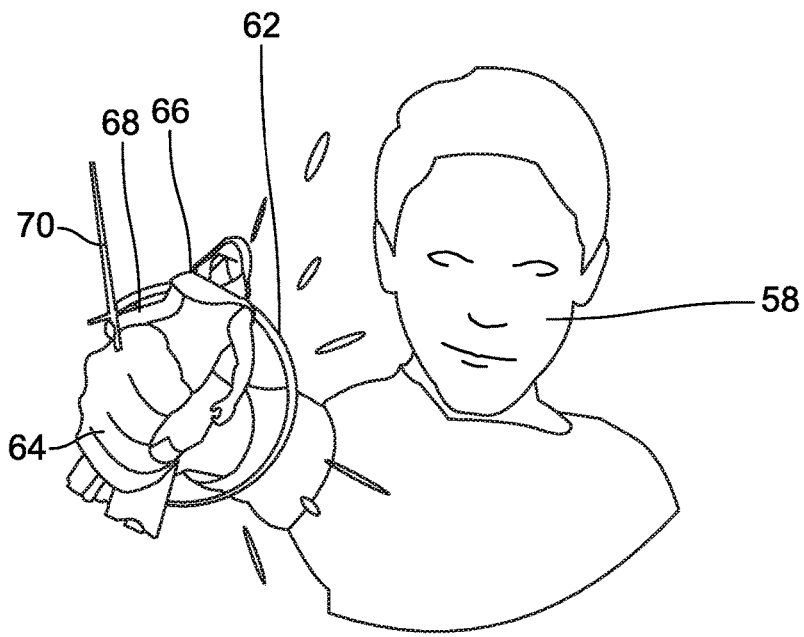
FIG. 4 shows a human-like toy action figure in use.

FIG. 3 shows the RFID reader loop antenna 60 as a body attachment in use. While the actual antenna is contained within the housing of the body attachment, in FIG. 3, it is shown in the player's hand to highlight the antenna signal. This figure shows that when a player 58 wears the wristlet body attachment 36 shown in FIG. 1B and lifts an arm to which the RFID reader loop antenna 60 is connected, an RFID antenna signal 62 is emitted in proximity to the player's hand 64. The RFID antenna signal 62 can thus read RFID tags from figures held in a player's hand 64. FIG. 4 shows a human-like toy action figure in use. In this figure, while the player 58 still wears the RFID reader loop antenna 60 shown in FIG. 3 that emits RFID antenna signal 62, the player 58 also holds action FIG. 66, which is within the range of RFID antenna signal 62. Thus, the body attachment 36 shown in FIG. 1B can identify the action FIG. 66 and play the appropriate speech or sound effects as described above.

Note also in FIG. 4 that the action figure right arm 68 is raised, so the red light saber 70 is illuminated. Other described embodiments do not distinguish arm position and the saber does not illuminate. Rather, in other described embodiments, tapping the device may awaken it. Additionally, other embodiments may appear in different configurations and with subsets of described features.

Figure 5:
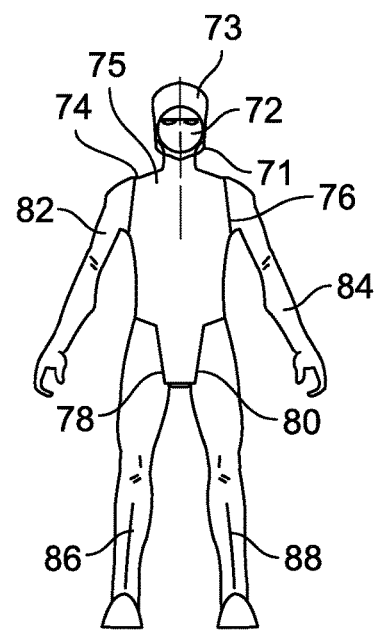
FIG. 5 shows five points of articulation on a toy figure.

In a described embodiment, the figures average about thirty decoration options and feature a minimum of five points of articulation. FIG. 5 shows five points of articulation on a toy figure. The head articulation point 72 allows the head 73 of the toy figure to rotate around a neck joint 71. Similarly, the right arm articulation point 74 allows the right arm 82 to rotate with respect to the torso 75; the left arm articulation point 76 allows the left arm 84 to rotate with respect to the torso 75; the right leg articulation point 78 allows the right leg 86 to rotate with respect to the torso 75; and the left leg articulation point 80 allows the left leg 88 to rotate with respect to the torso 75.

Figure 6:
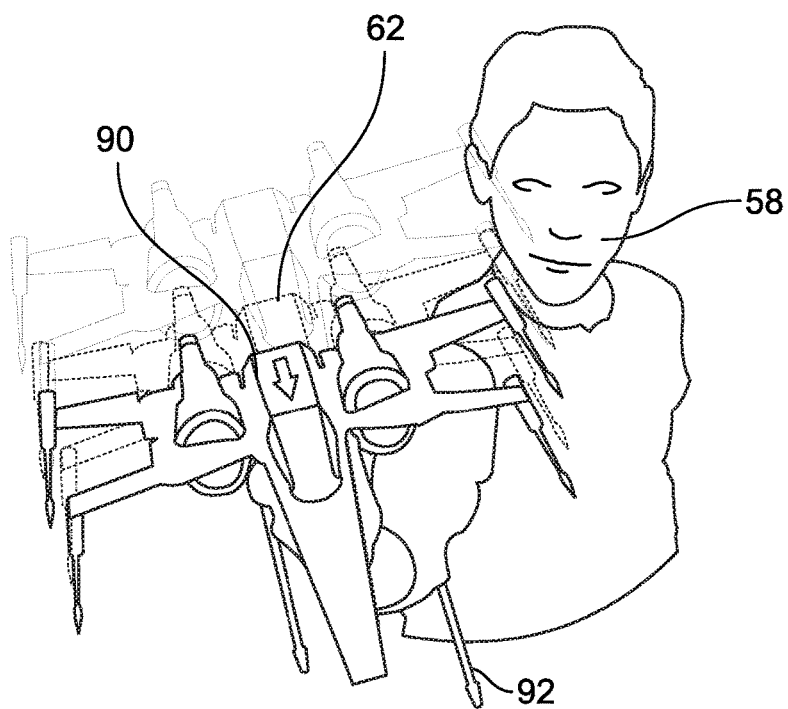
FIG. 6 shows a vehicle toy action figure in use.

FIG. 6 shows a vehicle 90 toy action figure in use. This figure shows that the player 58 holds the vehicle 90 within the range of the RFID antenna signal 62 so that the body attachment recognizes the vehicle and plays appropriate speech and sound effects. Further, in response to vehicle movement 92, the body attachment plays appropriate speech and sound effects related to the vehicle 90. The body attachment may play different sounds depending on how the vehicle 90, and action figures in general, move. Additionally, the speech and sounds emitted from the body attachment may vary depending on the number of moves of particular types that the player 58 makes as well as other variables or combinations thereof. For example, the first few times that the player 58 moves the vehicle 90, the vehicle 90 may cause the body attachment to make the same flying sound; however, the vehicle 90 may cause the body attachment to make a bombing sound on the fourth movement of a particular type. Thus, the body attachment enables the player 58 to pick up unique action figures and play speech and sound effects unique to the action figure and unique to various situations. In some embodiments, moving the vehicle 90 will pseudo-randomly play various flying sounds, and tapping the body attachment will play vehicle weapon sounds. Also, in some embodiments, the vehicles will not alter behavior based on the character within the vehicle, and no explosion noises occur from the vehicle.

Figure 7A:
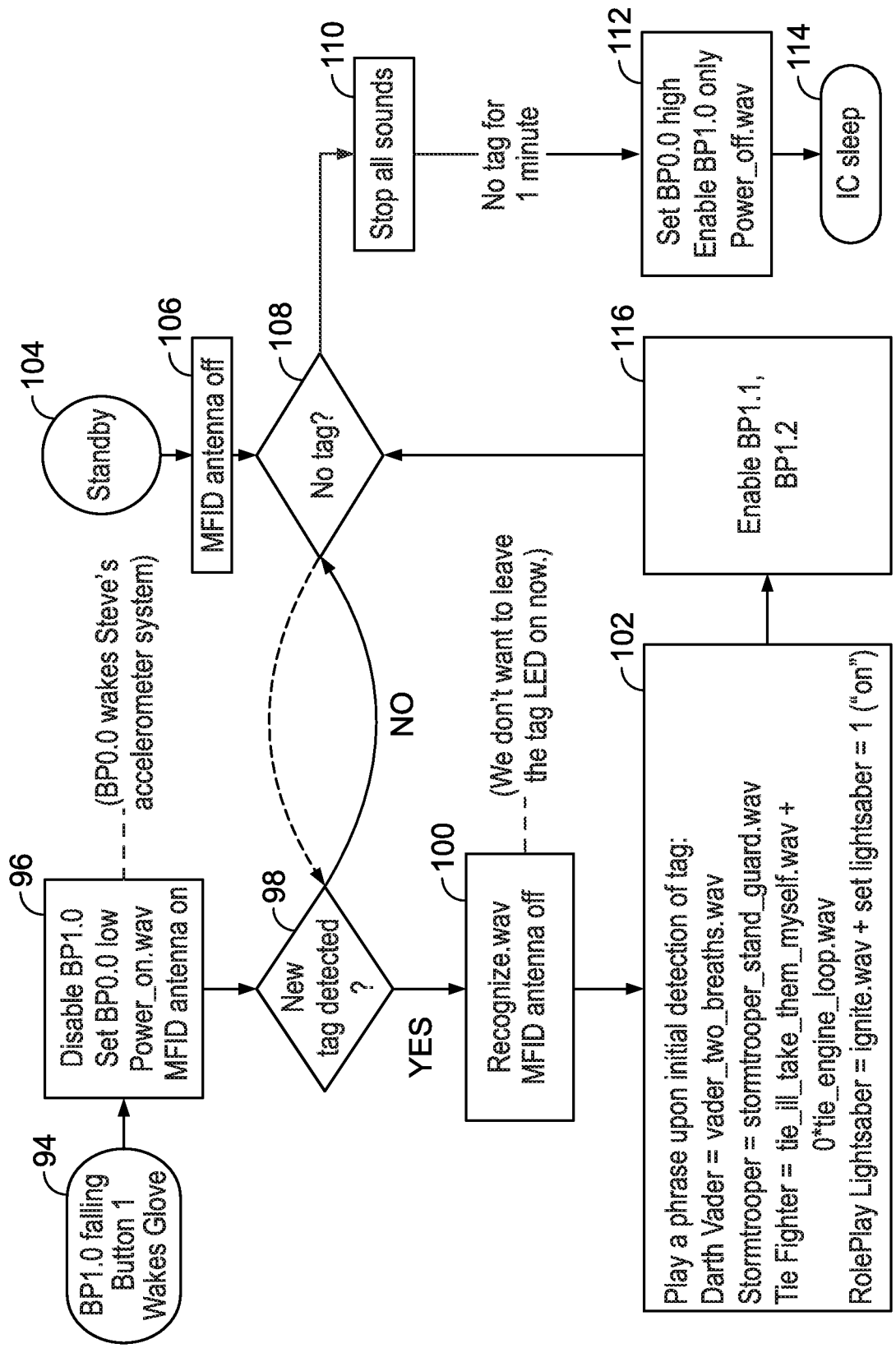
FIG. 7A shows a flow chart describing a body attachment power on sequence.

FIG. 7A shows a flow chart describing a body attachment power on sequence. The body attachment (glove or wristlet) is initially asleep and waiting for a player to wake the glove by pressing a button as in step 94. In step 96, parameters are set to show that the accelerometer in the glove has awakened. In some embodiments, waking from sleep occurs via a tap sensed by the accelerometer in low power mode. Also in step 96, the antenna is activated and speech and/or sound effects are played to indicate that the power has been enabled. Step 98 checks to see if a new tag is detected from a nearby action figure, or something similar. If a new tag is detected, then, in step 100, recognition sound effects are played and the antenna is deactivated, and, in step 102, the body attachment plays speech relating to the particular action figure. For example, if the action figure is Darth Vader™, the player will hear Darth Vader's™ speech and breathing; if the action figure is a storm trooper or a fighter, the body attachment will play speech belonging to the storm trooper or the fighter, respectively. After the speech from step 102, step 116 enables processes described later related to the recognized character.

Further, step 104 shows that the body attachment may enter a standby mode, and, in response to entering standby mode, step 106 deactivates the antenna. Then, step 108 responds to entering standby or to awakening and not detecting a tag by stopping all sounds in step 110, resetting parameters, disabling power and playing a power off sound in step 112 and going to sleep in step 114.

Figure 7B:
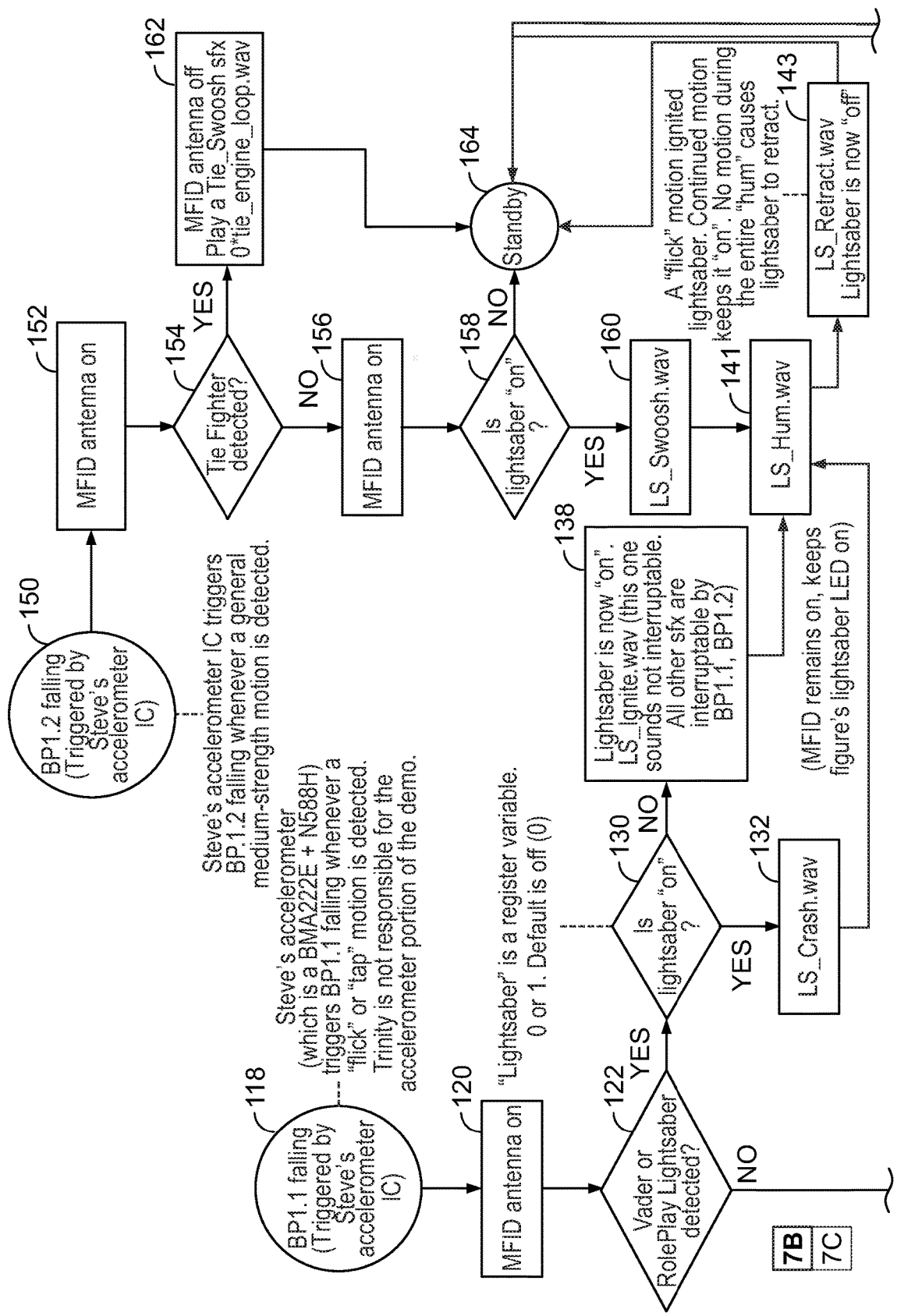
FIGS. 7B and 7C show a flow chart describing body attachment responses to particular motions.
Figure 7C:
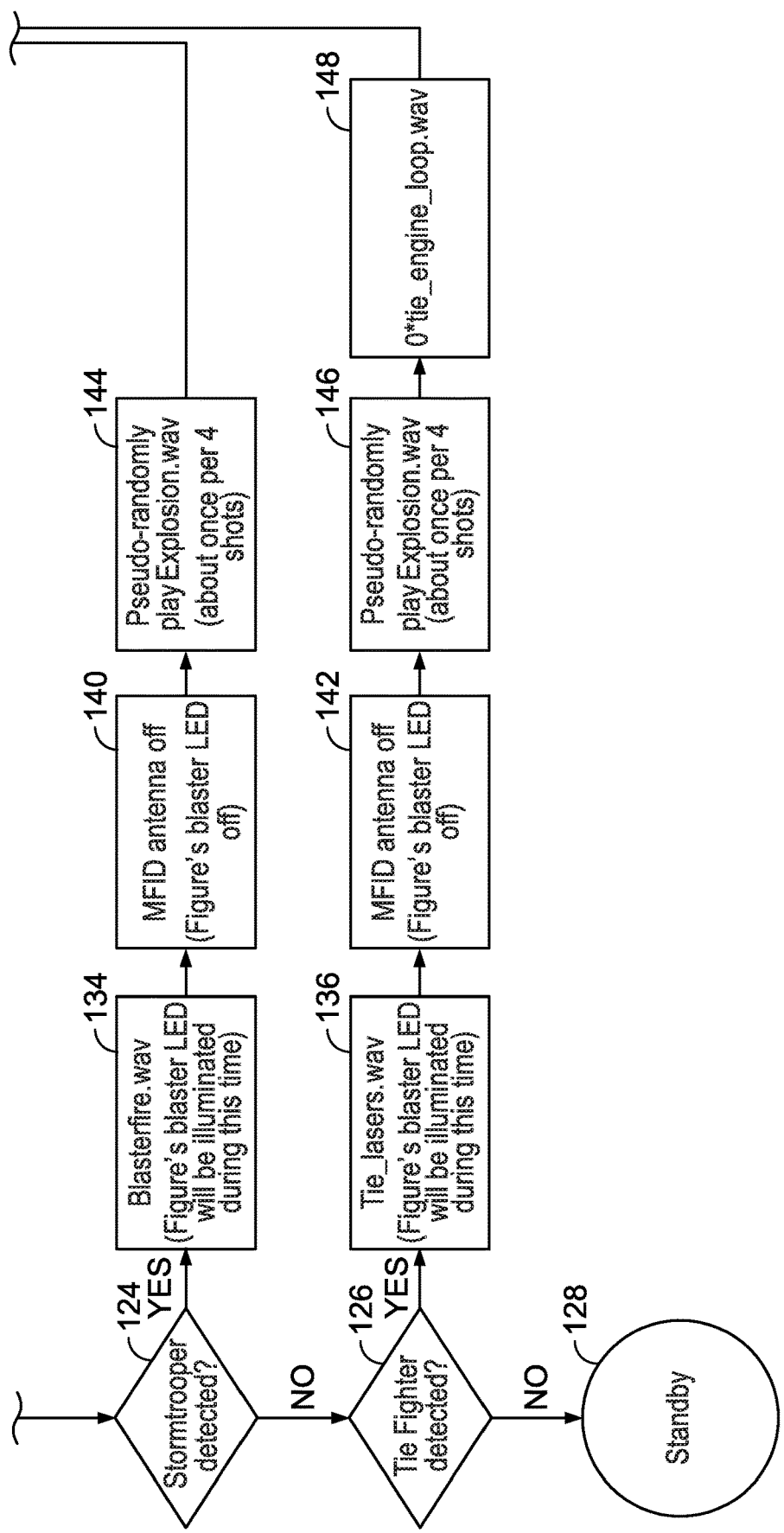

FIGS. 7B and 7C show a flow chart describing body attachment responses to particular motions. In step 118, the body attachment detects a "flick" motion or a "tap" motion and responds by activating the antenna in step 120. Step 122 checks to see if a Darth Vader™ character is detected, and, if not, step 124 checks to see if a storm trooper character is detected, and, if not, step 126 checks to see if a fighter character is detected.

If Darth Vader™ is detected, step 130 checks to see if a light saber is on if used in the embodiment. If the light saber is on, steps 132, 141 and 143 play appropriate sound effects, and step 142 turns off the light saber before entering standby in step 164. If the light saber is not on, step 138 turns on the light saber if appropriate, and steps 138, 140 and 142 play appropriate sound effects, before step 142 turns off the light saber if appropriate and enters standby in step 164. In step 142, continued motion will keep the light saber illuminated until the motion stops for a specific period of time. Then, step 164 standby is entered.

If a storm trooper is detected, step 134 illuminates the blaster LED and plays blaster fire sound effects. Step 140 then disables the antenna and the LED, and step 144 pseudo-randomly plays explosion sounds before entering standby in step 164.

If a fighter is detected, step 136 illuminates the blaster LED and plays laser fire sound effects. Step 142 then disables the antenna and the LED, and step 146 pseudo-randomly plays explosion sounds before playing more sound effects in step 148 and entering standby in step 164.

In step 150, the body attachment detects a general motion or a medium strength motion and responds by activating the antenna in step 152. Step 154 checks to see if a fighter character is detected, and, if not, step 156 ensures that the antenna is activated. Next, step 158 checks to see if a light saber is on. If no light saber is on, standby is entered in step 164. If the light saber is on, steps 160, 140 and 142 play appropriate sound effects and speech, and step 142 turns off the light saber and enters standby in step 164. If a fighter is detected in step 154, step 162 turns off the antenna and plays appropriate sound effects before entering standby in step 164.

The next several figures include flow charts describing how the various parts of the embodiments functions. Within FIG. 8A through FIG. 14, a "sweep" may alternatively be called a "swoosh", and a "forward lunge" or "lunge" may be called a "flick".

Figure 8A:
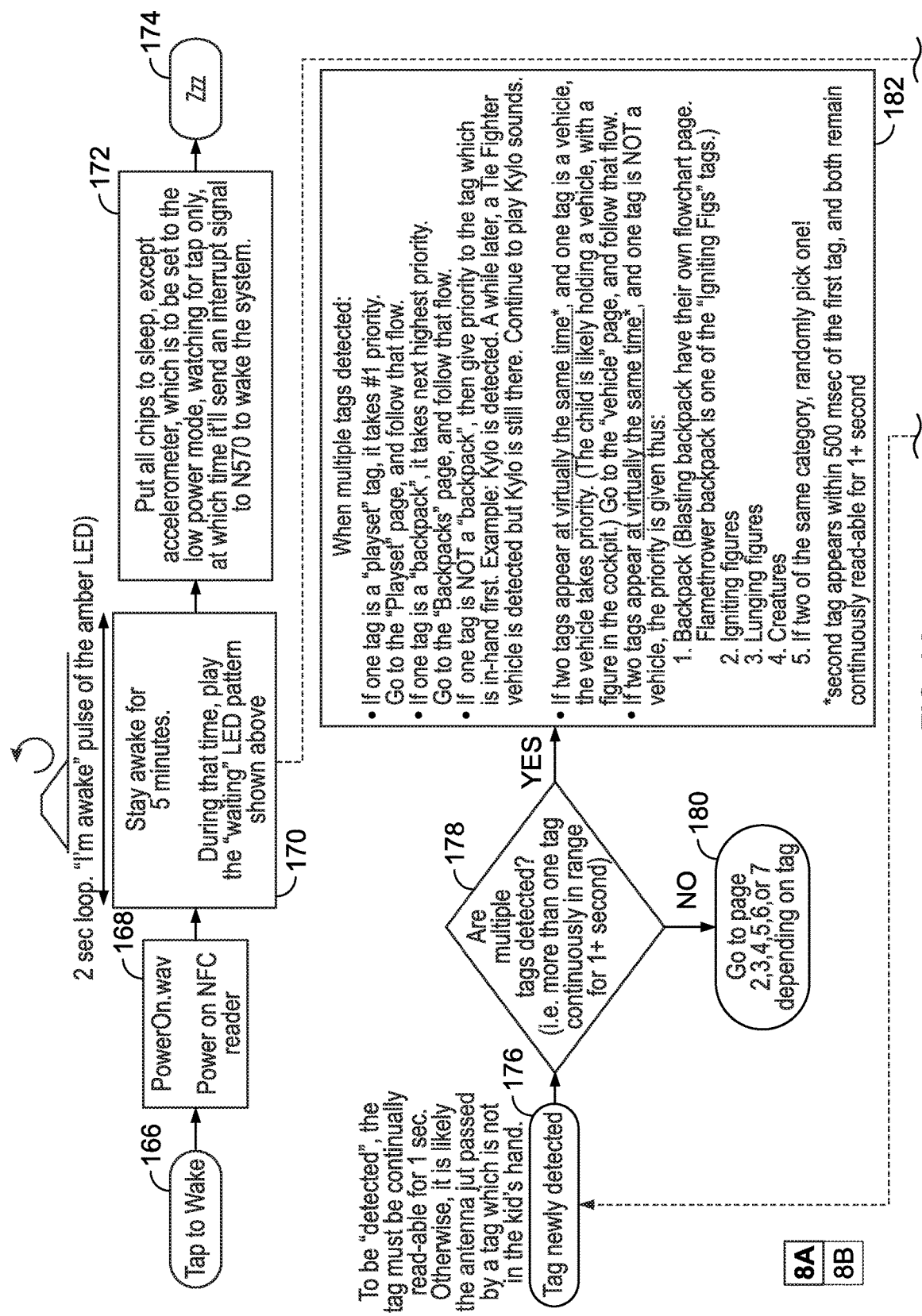
FIGS. 8A and 8B show a flow chart describing tag detection.
Figure 8B:
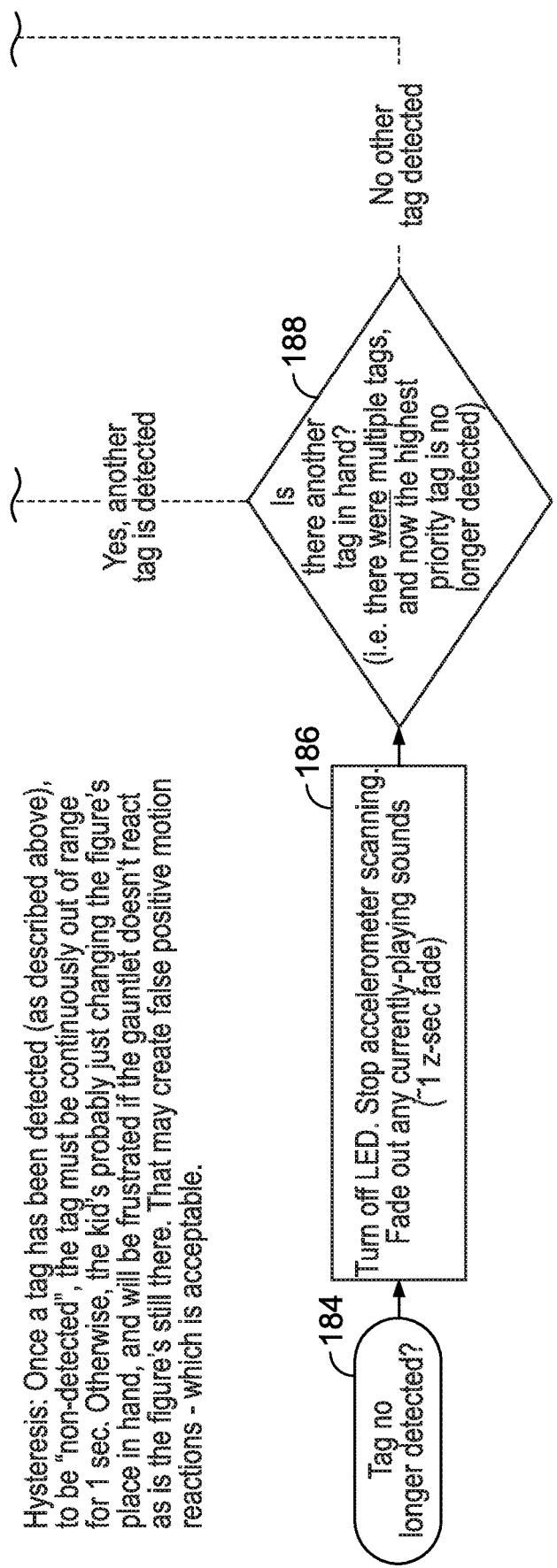

FIGS. 8A and 8B show a flow chart describing tag detection. Initially, the system is asleep, and in step 166, a player taps the body attachment to wake it. In step 168, the NFC reader is turned on and a power on sound effect is played. In step 170, the system stays awake for five minutes and plays an LED pattern to indicate that it is waiting to detect an RFID tag. After five minutes, step 172 puts everything to sleep, except the accelerometer, which is set to low, and goes to step 174 to sleep and to wait for a tap, at which time it sends an interrupt to awaken the system.

If a tap is received while sleeping and a tag is newly detected in step 176, step 178 checks to see if multiple tags are detected. To be "detected", a tag must be continually readable for one second. Otherwise, it is likely the antenna just passed by a tag which is not in the player's hand. If a single tag is detected, step 180 refers the reader to a tag-specific flow chart. If multiple tags are detected, step 182 checks to see if one tag is a backpack, which takes priority. If one tag is a backpack, see the backpack flowchart in FIG. 13. If no tags are backpacks, then the tag received first gets priority. For example, a character named Kylo is detected, and awhile later, a Tie Fighter (an imperial Star Wars™ space ship) vehicle is detected but Kylo is still there. Kylo maintains priority, and sounds and speaking related to Kylo continue. If two tags appear at virtually the same time, within 500 msec of each other, and one tag is a vehicle, the vehicle takes priority. Go to the vehicle flowchart in FIG. 12. If two tags appear at virtually the same time, within 500 msec of each other and readable for more than one second, and one tag is not a vehicle, the priorities are as follows: 1) backpack, 2) igniting figures, 3) lunging figures, and 4) creatures. If two simultaneous tags are from the same category, one gets randomly picked.

Because of hysteresis, once a tag has been detected (as described above), to be "non-detected", the tag must be continuously out of range for one second. Otherwise, the player is probably just changing the figure's place in hand, and will be frustrated if the body attachment does not react as if the figure is still there. This may create false positive motion reactions, which is acceptable. Thus, in step 184, when a tag is no longer detected, step 186 turns off all LEDs, stops checking for accelerometer data and fades all playing sounds for one second.

Figure 9A:
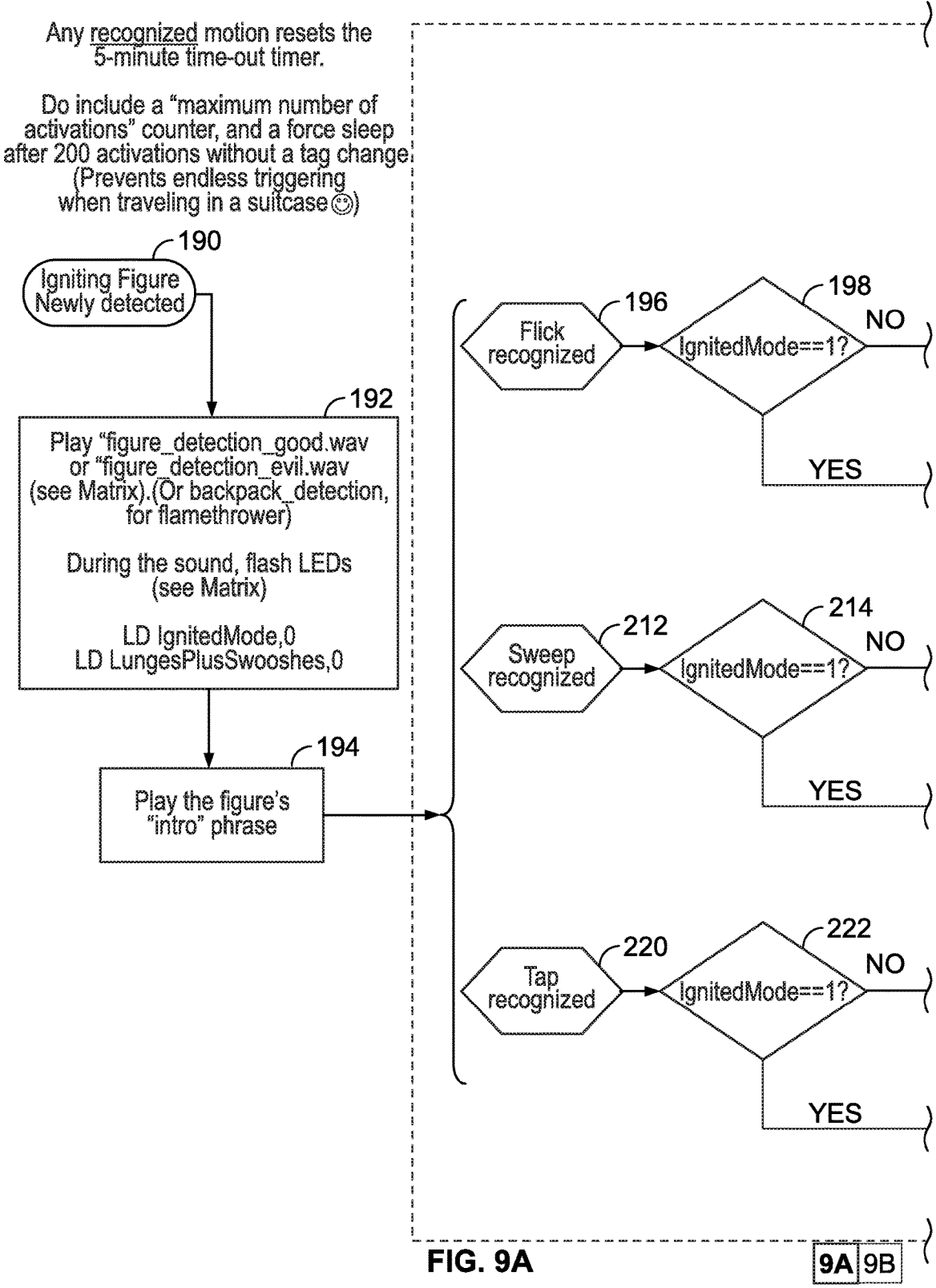
FIGS. 9A and 9B show a flow chart describing igniting toy action figure behavior.
Figure 9B:
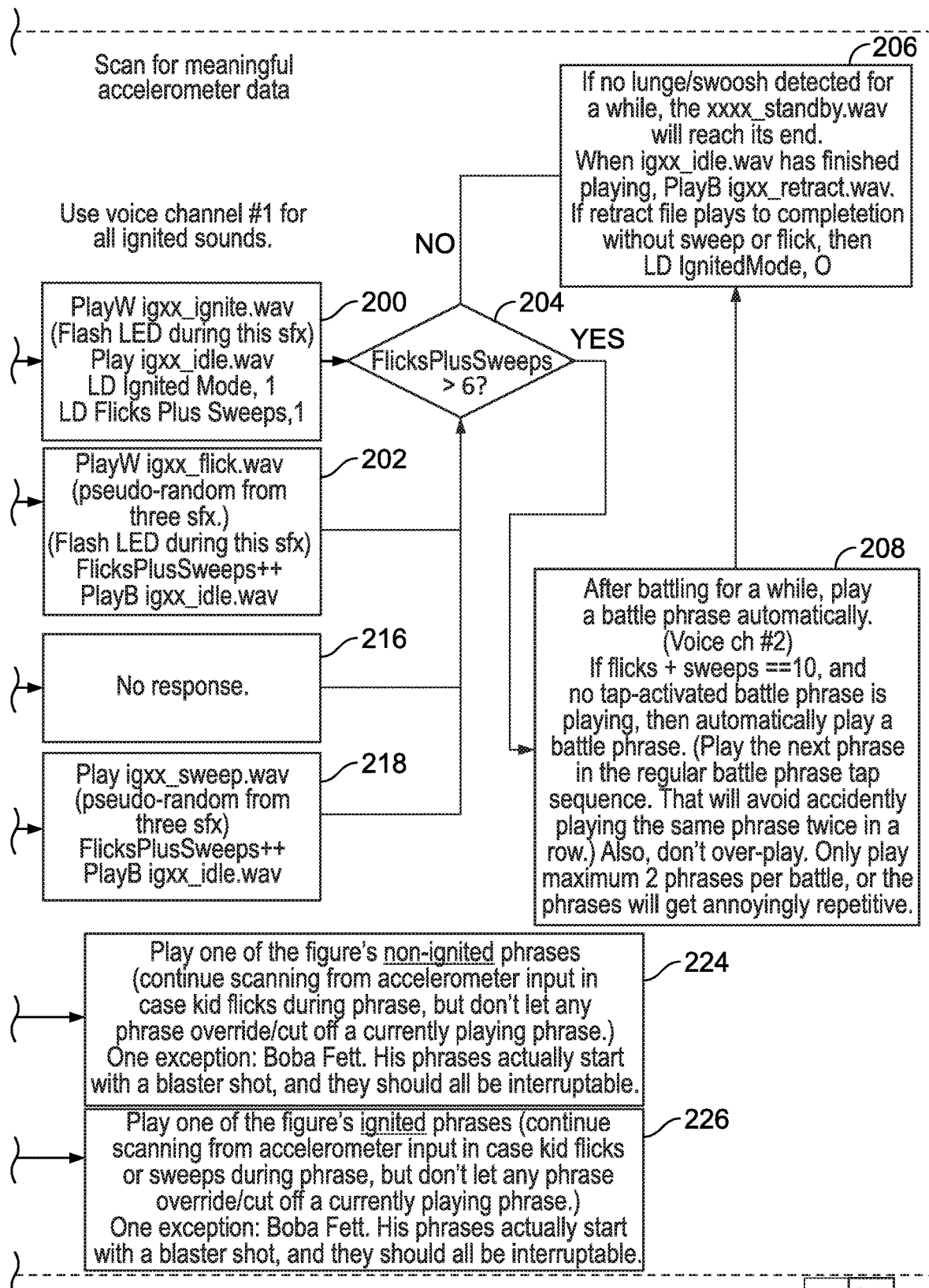

FIGS. 9A and 9B show a flow chart describing igniting toy action figure behavior. Igniting figures include light saber figures, force lightning figures, an electric axe figure, a lightning rod figure, a sword figure, a flamethrower backpack and figures named: "Victor Guard", "C2PO", "Boba Fett", and "R2D2". In step 190, an igniting figure is newly detected, and step 192 plays character-appropriate sound, flashes LEDs and sets parameters. Step 194 then plays introduction sounds specifically associated with the detected figure.

For the following steps, any recognized motion resets a 5-minute time-out timer. The system should include a "maximum number of activations" counter, and force sleep after 200 activations without a tag change. This prevents endless triggering when travelling in a car trunk.

In step 196, a flick is recognized. If the toy figure is in ignited mode as checked in step 198, then, in step 200, sound is played and LEDs are flashed to indicate ignited mode. Then, sounds are played to indicate idleness, and the number of counted flicks plus sweeps is increased. If the toy figure is not in ignited mode as checked in step 198, then, in step 202, sound is played and LEDs are flashed to indicate non-ignited mode. Then, sounds are played to indicate idleness, and the number of counted flicks plus sweeps is increased.

Next, step 204 checks to see if the number of flicks plus sweeps is greater than six. If the number of flicks plus sweeps is not greater than six, then, in step 206, if no flick or sweep is detected for a while, the standby sounds will reach its end. When the standby sounds have finished playing, retracting sounds will play. If the retracting sounds complete before another sweep or flick, then ignited mode ceases and playing music fades. In step 204, if the number of flicks plus sweeps is greater than six, then, in step 208, after a battle continues for a while, a battle phrase automatically plays over a voice channel. Alternatively, before the battle phrase plays, music may begin. A matrix, defined below, is checked to determine if the detected object has music, and, if so, the music corresponding to the detected character is played. In a described embodiment, there is no music for Flying Figs, Lunging Figs, Creatures, Vehicles, or Backpacks; there will be three music selections included: 1) Imperial March; 2) Kylo's Theme; and 3) Duel of Fates. Each theme will be played as a simple sequence and as a background command. Once started, the music will continue automatically. Some embodiments do not include music.

If flicks plus sweeps equals ten, and no tap-activated battle phrase is playing, then the next phrase in the regular battle phrase tap sequence automatically plays. This will avoid accidentally playing the same phrase twice in a row. After step 208, then, in step 206, if no flick or sweep is detected for a while, the standby sounds will reach its end. When the standby sounds have finished playing, retracting sounds will play. If the retracting sounds complete before another sweep or flick, then ignited mode ceases and playing music fades.

In step 212, a sweep is recognized. If the toy figure is not in ignited mode as checked in step 214, then, in step 216, no response is given, and the system proceeds to step 204 and beyond as described above. If the toy figure is in ignited mode as checked in step 214, then, in step 218, sound is played and LEDs are flashed to indicate ignited mode. Then, sounds are played to indicate idleness, and the number of counted flicks plus sweeps is increased, and the system proceeds to step 204 and beyond as described above.

In step 220, a tap is recognized. If the toy figure is not in ignited mode as checked in step 222, then, in step 224, one of the figure's non-ignited phrases is played and the system continues scanning for accelerometer input in case the player flicks during the phrase. However, no phrase should override or interrupt a currently playing phrase except when specified. E.g. for Boba Fett, his phrases actually start with a blaster shot, and they should all be interrupt-able. If the toy figure is in ignited mode as checked in step 222, then, in step 226, one of the figure's ignited phrases is played and the system continues scanning for accelerometer input in case the player flicks during the phrase. However, in ignited mode, as in non-ignited mode, no phrase should override or interrupt a currently playing phrase except when specified. E.g. for Boba Fett, his phrases actually start with a blaster shot, and they should all be interrupt-able.

For the next figure, lunging, igniting, creatures, and vehicle, etc. . . . are categories of the mapping between sensed motion, and sound response. The master chip and accelerometer are always looking for a Flick, Sweep, or Tap. But, depending on the particular tagged item, those sensed motions do different things. These categories are groupings of the mapping of sensed motion to how the master chip handles that sensed motion in terms of what type of sound it plays, when, and for what motion.

Figure 10A:
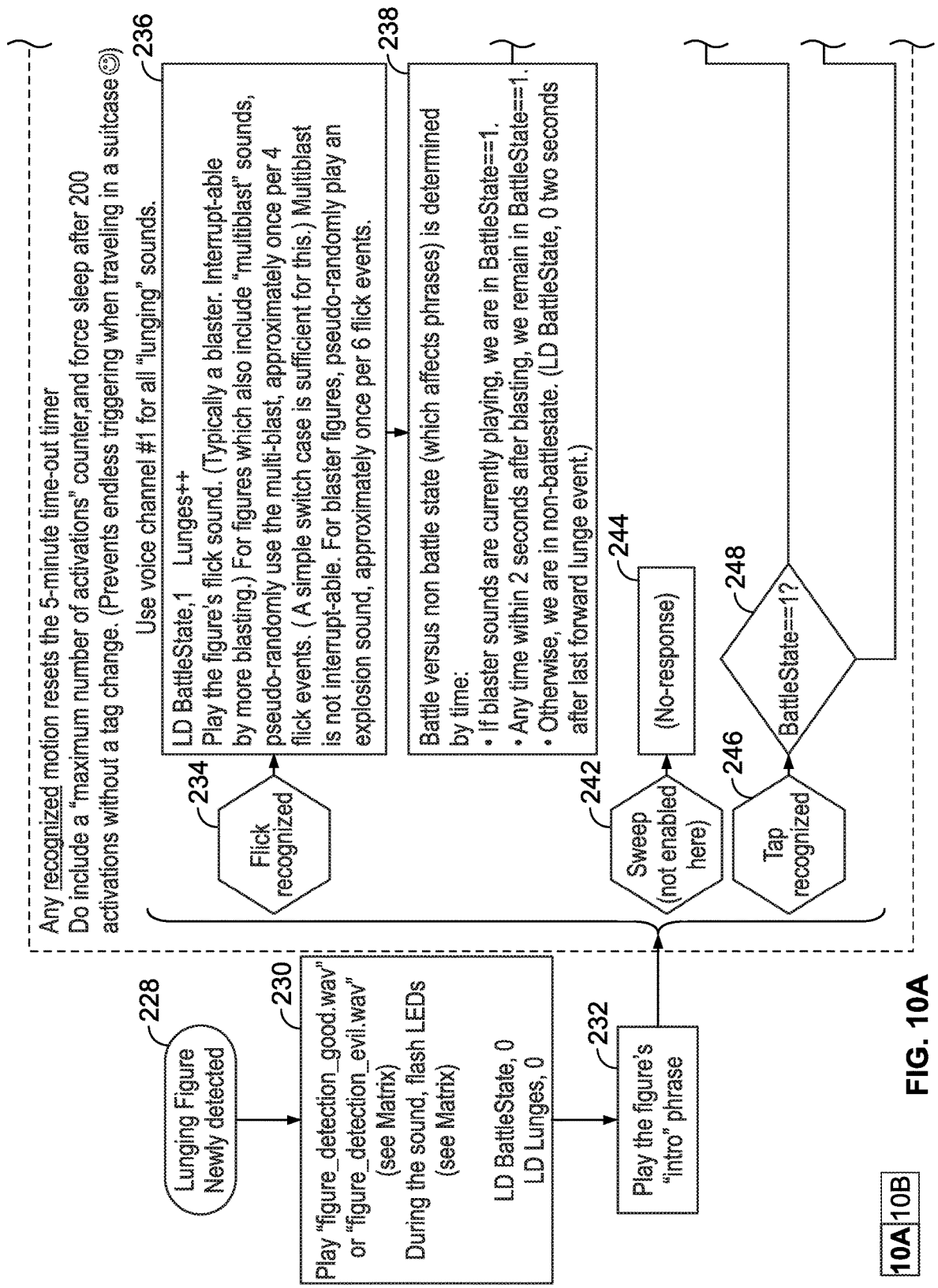

FIGS. 10A and 10B show a flow chart describing lunging toy action figure behavior. Lunging figures include figures with blasters, such as storm troopers, and figures named: "BB8" and "Cool Beta Grey". In step 228, a lunging figure is newly detected, and step 230 plays character-appropriate sound, flashes LEDs and sets parameters. Step 232 then plays introduction sounds specifically associated with the detected figure. Some embodiments may also include characters such as beak handlers.

For the following steps, any recognized motion resets a 5-minute time-out timer. The system should include a "maximum number of activations" counter, and force sleep after 200 activations without a tag change. This prevents endless triggering when travelling in a car trunk.

In step 234, a flick is recognized. In step 236, a battle state is recognized and set. The number of flicks is increased, and the figure's lunging sound is played. For figures which also include "multiblast" sounds, the multi-blast is pseudo-randomly used approximately once per four flick events. A simple switch case is sufficient for this. Multiblast is not interrupt-able. For blaster figures, explosion sounds are pseudo-randomly played approximately once per 6 flick events.

Next, in step 238 a battle versus non-battle state, which affects phrases, is determined by time. If blaster sounds are currently playing, the player is in a battle state. Any time within 2 seconds after blasting, battle state remains set. Otherwise, the player is in a non-battle state. Then, in step 240, after blasting for a while, a battle phrase is played automatically. If the number of flicks equals ten, and no battle phrase is playing, then a battle phrase is automatically played. The next phrase in the regular battle phrase tap sequence is played to avoid accidentally playing the same phrase twice in a row.

In step 242, a sweep is recognized. Then, in step 244, no response is given.

In step 246, a tap is recognized, and step 248 checks to see if the player is in a battle state. If the player is not in a battle state, then step 250 plays one of the figure's non-battle phrases and the system continues scanning for accelerometer input in case the player flicks during the phrase. The output response may reference matrix data tables discussed for tags and user inputs. However, no phrase should override or interrupt a currently playing phrase. If the player is in a battle state, then step 252 plays one of the figure's battle phrases and the system continues scanning for accelerometer input in case the player flicks during the phrase. However, in battle state, as in non-battle state, no phrase should override or interrupt a currently playing phrase.

Figure 11:
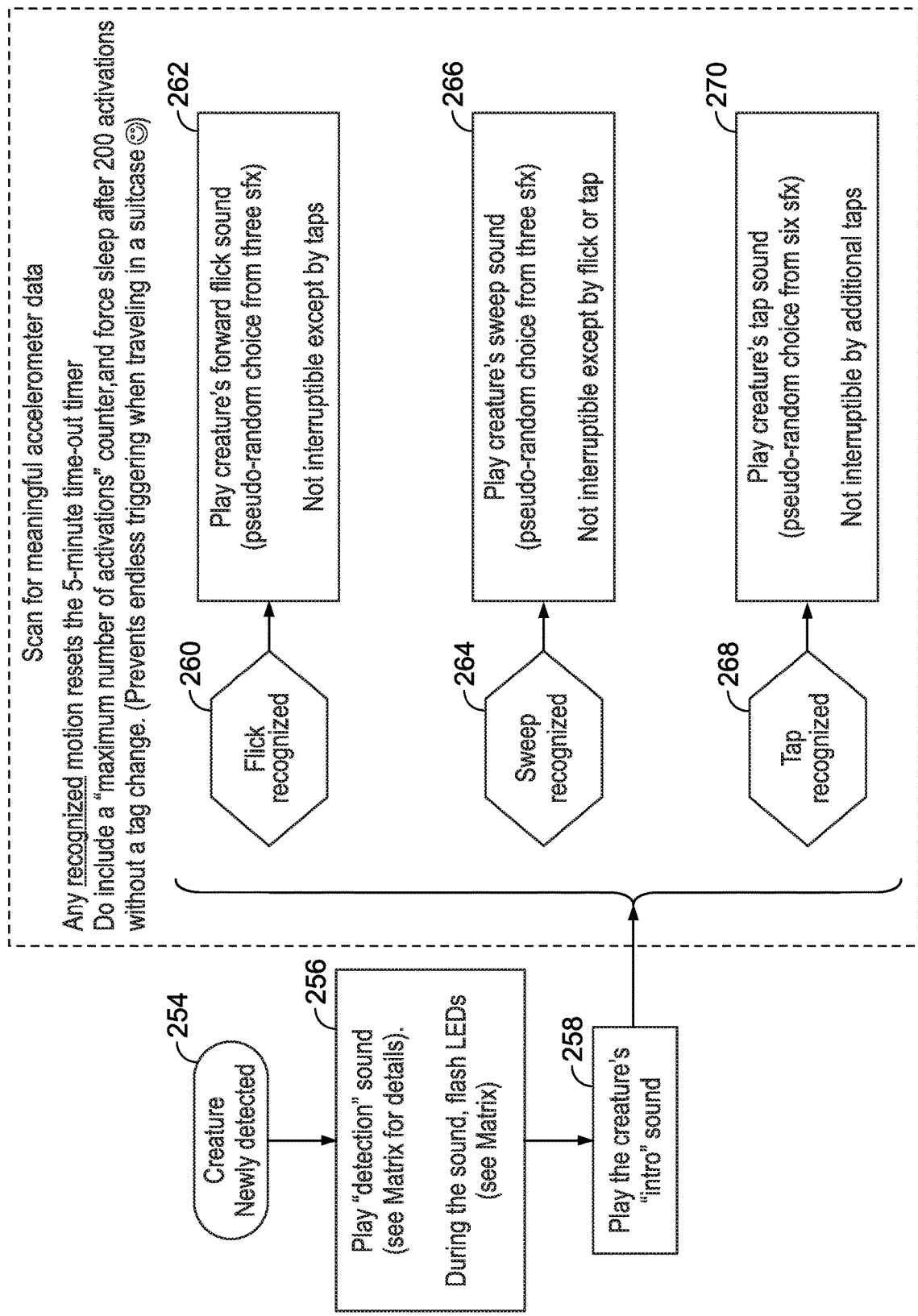
FIG. 11 shows a flow chart describing creature toy action figure behavior.

FIG. 11 shows a flow chart describing creature toy action figure behavior. Creature figures include characters named, "Rathtar", "Probe Droid" and "Hoof". In step 254, a creature is newly detected, and step 256 plays character-appropriate sound and flashes LEDs. Step 258 then plays introduction sounds specifically associated with the detected figure.

In step 260, a flick is recognized, and in step 262, the creature's flick sound is played in a pseudo-random fashion. In step 264, a sweep is recognized, and in step 266, the creature's sweep sound is played in a pseudo-random fashion. In step 268, a tap is recognized, and in step 270, the creature's tap sound is played in a pseudo-random fashion. The creatures' sounds are not interruptible except as shown in the figure.

FIG. 12 shows a flow chart describing vehicle toy action figure behavior. Vehicles include vehicle figures named, "Aero 1", "Carver", "Tango Neon Speeder", "Victor 1's Echo", "Beta 2's Xray", "EP8 Tie Fighter", and "Sabine A-Wing". In step 272, a vehicle is newly detected, and step 274 plays character-appropriate sound and flashes LEDs. Step 276 then plays introduction sounds specifically associated with the detected figure, and step 278 plays the vehicle's quiet idle sound effect in an endless loop while the tag is present until a 5-minute timeout is reached. Any recognized motion resets the 5-minute timeout timer. A "maximum number of activations" counter is included to force sleep after 200 activations without a tag change. This prevents endless triggering when travelling in a car trunk.

In step 280, a flick is recognized. Then, in step 282, no response is given.

In step 286, a sweep is recognized, and in step 288, the vehicle's sweep sound is played in a pseudo-random fashion and the vehicle's engine running sound is played. Next, in step 284, if no sweep is detected for a while, the "engine running" sound effect will reach its end. Then, the vehicle's "quiet idle" is played in an endless loop while the tag is present, and sleep is forced after 5 minutes of inactivity.

In step 290, a tap is recognized, and in step 292, the vehicle's weapon sound is played and is interruptible. Next, in step 284, if no sweep is detected for a while, the "engine running" sound effect will reach its end. Then, the vehicle's "quiet idle" is played in an endless loop while the tag is present, and sleep is forced after 5 minutes of inactivity.

Figure 13:
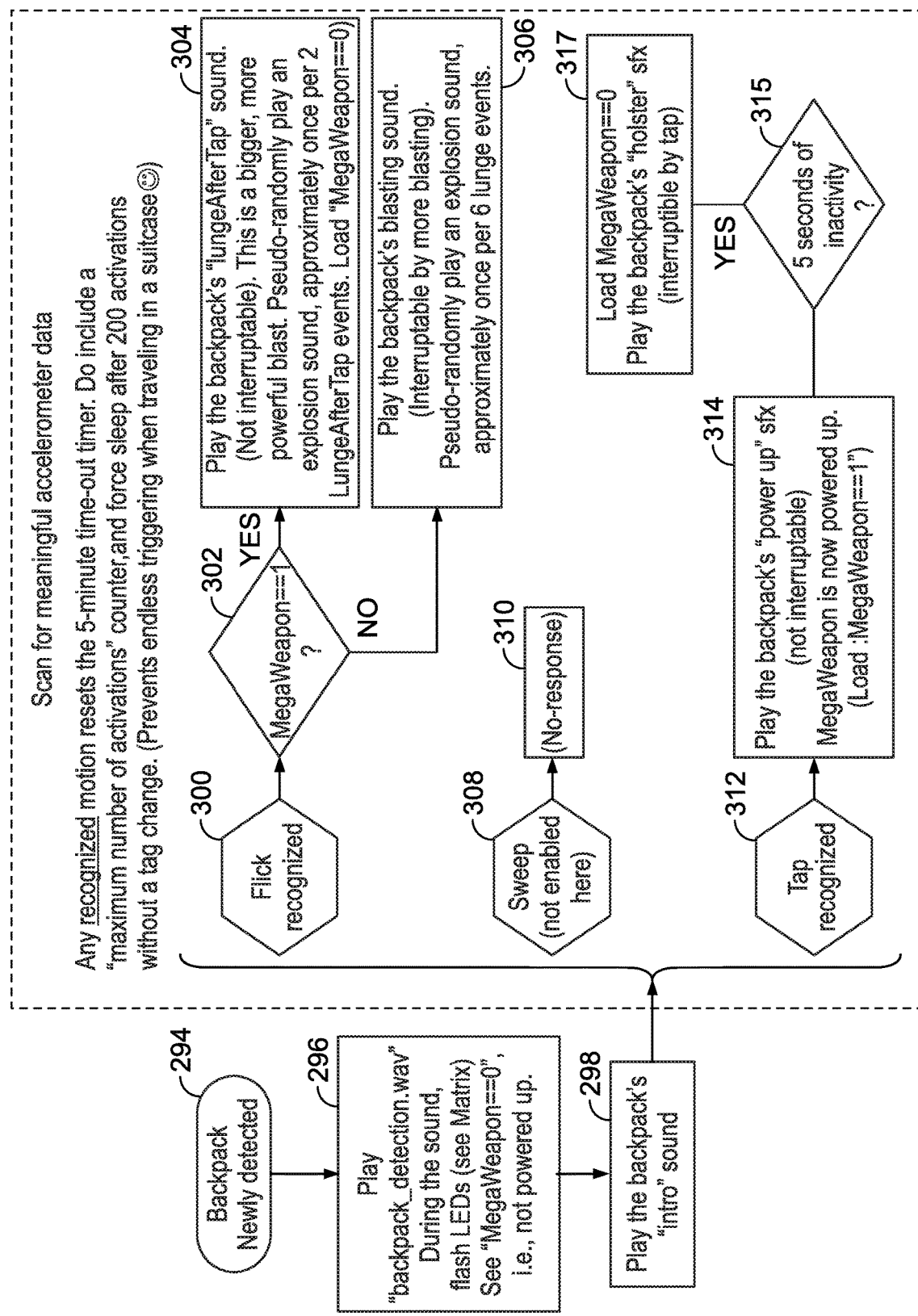
FIG. 13 shows a flow chart describing blaster-type backpack behavior.

FIG. 13 shows a flow chart describing blaster-type backpack behavior. The described embodiments include three types of backpacks. In step 294, a blaster-type backpack is newly detected, and step 296 plays backpack-appropriate sound and flashes LEDs. The mega weapons presence is turned off. Step 298 then plays introduction sounds specifically associated with the detected figure. Any recognized motion resets the 5-minute timeout timer. A "maximum number of activations" counter is included to force sleep after 200 activations without a tag change. This prevents endless triggering when travelling in a car trunk.

In step 300, a flick is recognized. Then, step 302 checks to see if mega weapons presence is turned on. If mega weapons presence is turned on, then step 304 plays a non-interruptible backpack "megablasting" sound pseudo-randomly about every six flicks. Then, mega blaster presence is turned off. If mega weapons presence is turned off, then step 306 plays an interruptible backpack regular blasting sound pseudo-randomly about every six flicks.

In step 308, a sweep is recognized. Then, in step 310, no response is given.

In step 312, a tap is recognized, and in step 314, the backpack's power-up sound is played, and mega blasting is turned on. Step 315 checks for 5 seconds of inactivity, and, if there is 5 seconds of inactivity, in Step 317, mega weapons presence is turned off and a holstering sound is played.

Figure 14:
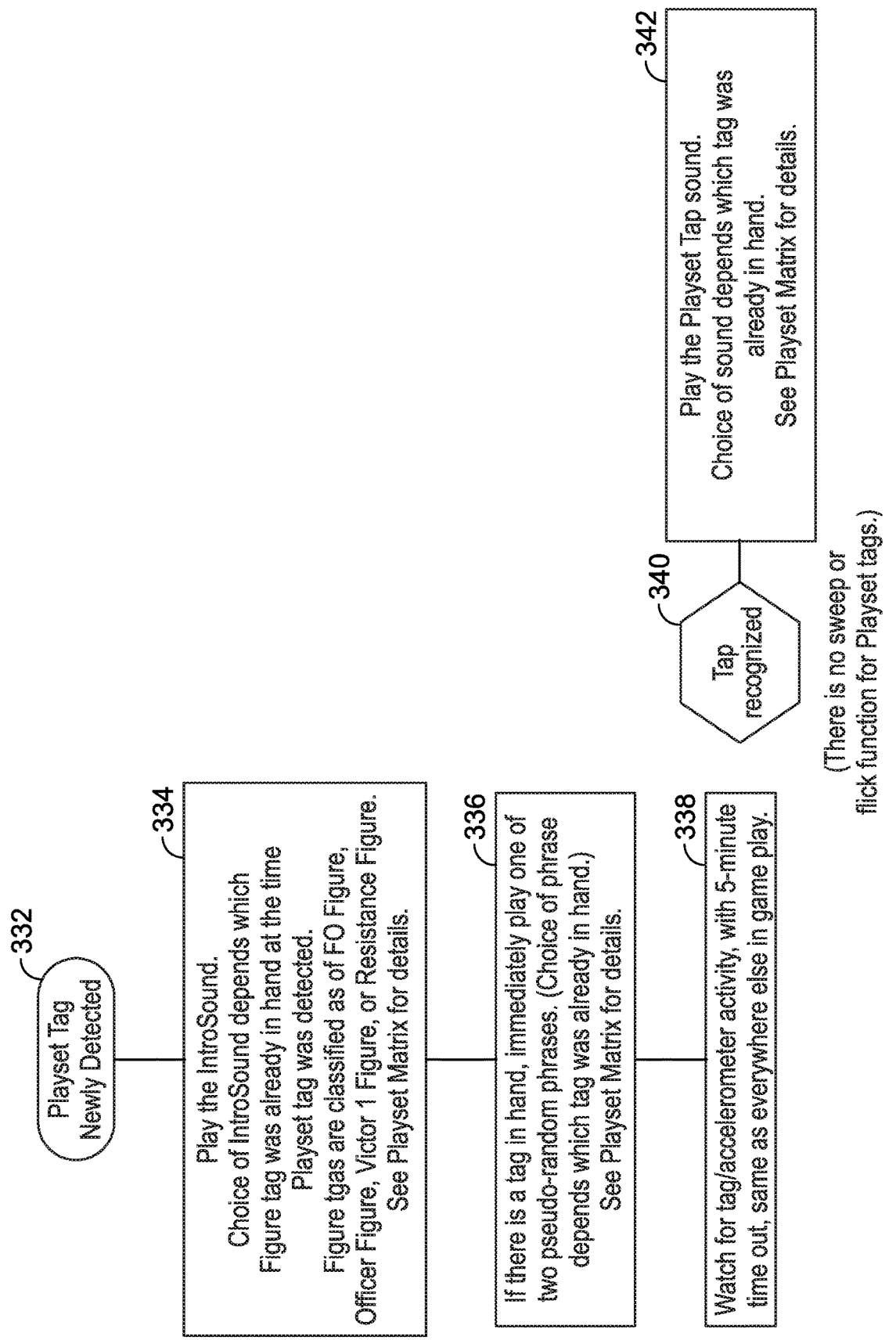
FIG. 14 shows a flow chart describing playset tag behavior.

FIG. 14 shows a flow chart describing playset tag behavior. Playset tags override the function of any other tag. Even if another tag is in hand, its normal function is disabled as long as the playset tag is detected. However, the tag in hand affects the sounds played. There is no sweep or flick function for playset tags. In step 332, a playset tag is newly detected. In step 334, the appropriate introduction sound is played, where the sound depends on which figure tag was already in hand when the playset tag was detected. Figure tags are classified as FO Figure, Officer Figure, Victor 1 Figure, or Resistance Figure. The matrix referred to below provides further details. In step 336, if there is a tag in hand, one of two pseudo-random phrases are played immediately depending on which tag is already in hand. The matrix referred to below provides further details. Step 338 watches for tag and accelerometer activity with a 5-minute timeout as described above. In step 340, a tap is recognized, and, in step 342, the playset tap sound is played. Which specific sound is played depends on which tag was already in hand. The matrix referred to below provides further details. Thus, the matrix functions as a look up table to find sounds to be played based on the parameters in the running program.

The disclosed wearable player body attachment and master processor facilitate associated motions detections via tag reader/antenna subsystem input to recognize unique play object identifiers of toy objects held at the player's hand, with the audio subsystem issuing verbal announcements and sound effects outputs associated with sequences of detected motions. The body attachment queries the database with the toy identity and recognized motions and produces sensory detectible outputs. As disclosed herein the database is stored as a matrix table for many figures or vehicles, detects and recognizes specific motions for associated sounds with the action figures toy vehicles, and accessories.

Figure 15:
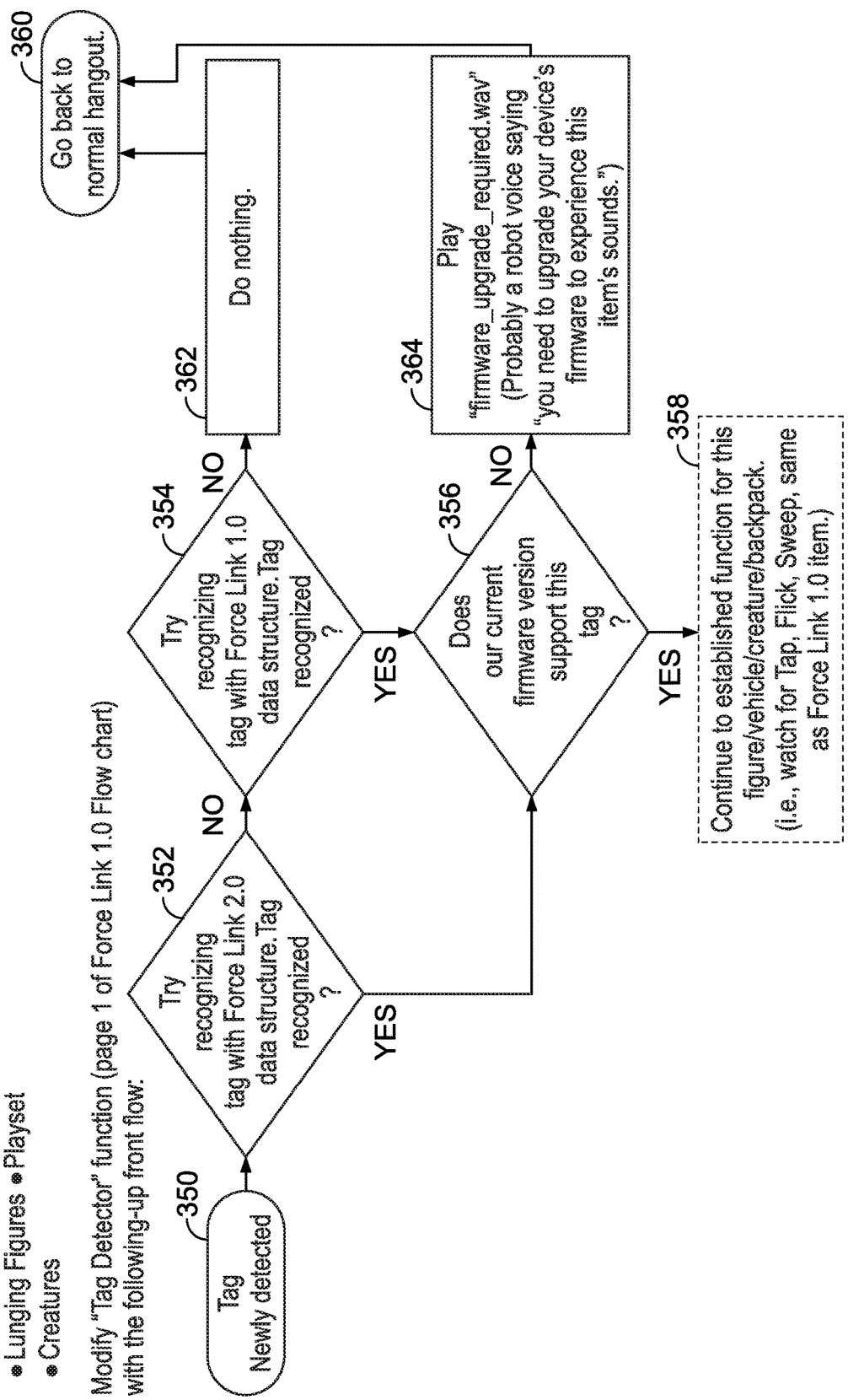
FIG. 15 shows a flow chart for functional game play tag reading of igniting figures, lunging figures, creatures, vehicles, and backpacks.

FIG. 15 shows a flow chart for functional game play tag reading of igniting figures, lunging figures, creatures, vehicles, and backpacks. The play activity method and system for the plurality of play objects with a player body attachment includes at least one of the plurality of play objects as a first toy object held in a player's hand, and may include at least one other of the plurality of play objects as a second toy object. Proceeding to identify the plurality of play objects with one or more play object identifiers, each of the plurality of play objects comprising a tag for transmitting one or more of the play object identifiers, the Modify "Tag Detector" function at Block 350 detects a newly detected Tag at Block 352. Try recognizing tag with Force Link 2.0 data structure. Tag recognized No/Yes? at Block 354. Try recognizing tag with Force Link 1.0 data structure. Tag recognized No/Yes? at Block 356. Does our current firmware version support this tag No/Yes? at Block 358. Continue to established function for this figure/vehicle/creature/backpack. (i.e., watch for Tap, Flick, Sweep, same as Force Link 1.0 item) at Block 360. Go back to normal hangout at Block 362 or Do nothing Block 364, and Play "firmware upgrade required.wav" (robot voice saying "you need to upgrade your device's firmware to experience this item's sounds"); accordingly outputting at least one audio response at the housing with the audio subsystem responsive to the master processor associating the one or more detected motions with the first unique ID, the play object identifiers and the first player device being used together according to a sequence of play object identifiers and the detected motions associated with the player's hand responsive to the master processor for issuing verbal announcements and sound effects.

The second player device is also configured to communicate wirelessly with the antenna subsystem of the first device. The second player device identifies one or more of the plurality of play objects for use with one or more additional players, reads the unique IDs of the toy objects in proximity of the second player device, and initiates communication between the first player device and the second player device based on detected motion of each player device, including sending the toy object unique IDs of the reading steps of the first player device and the second player device. Multiple body attachments can detect one another via an activation trigger or mechanism and communicate via a wireless communication protocol such as infrared or radio frequency for example Bluetooth or WIFI. An exemplary embodiment uses a 2.4 GHz wireless signal to communicate between multiple body attachments. The relationship between the characters in the entertainment story may affect what behavior governs the social play. Characters with a tier 1 relationship, a close story relationship, will trigger a unique set of phrases and interactions when involved in social play. Characters with a tier 2 relationship, characters without a direct story interaction, will trigger more generic lines based on the overall behavior of those characters and their allegiances.

Figure 16A:
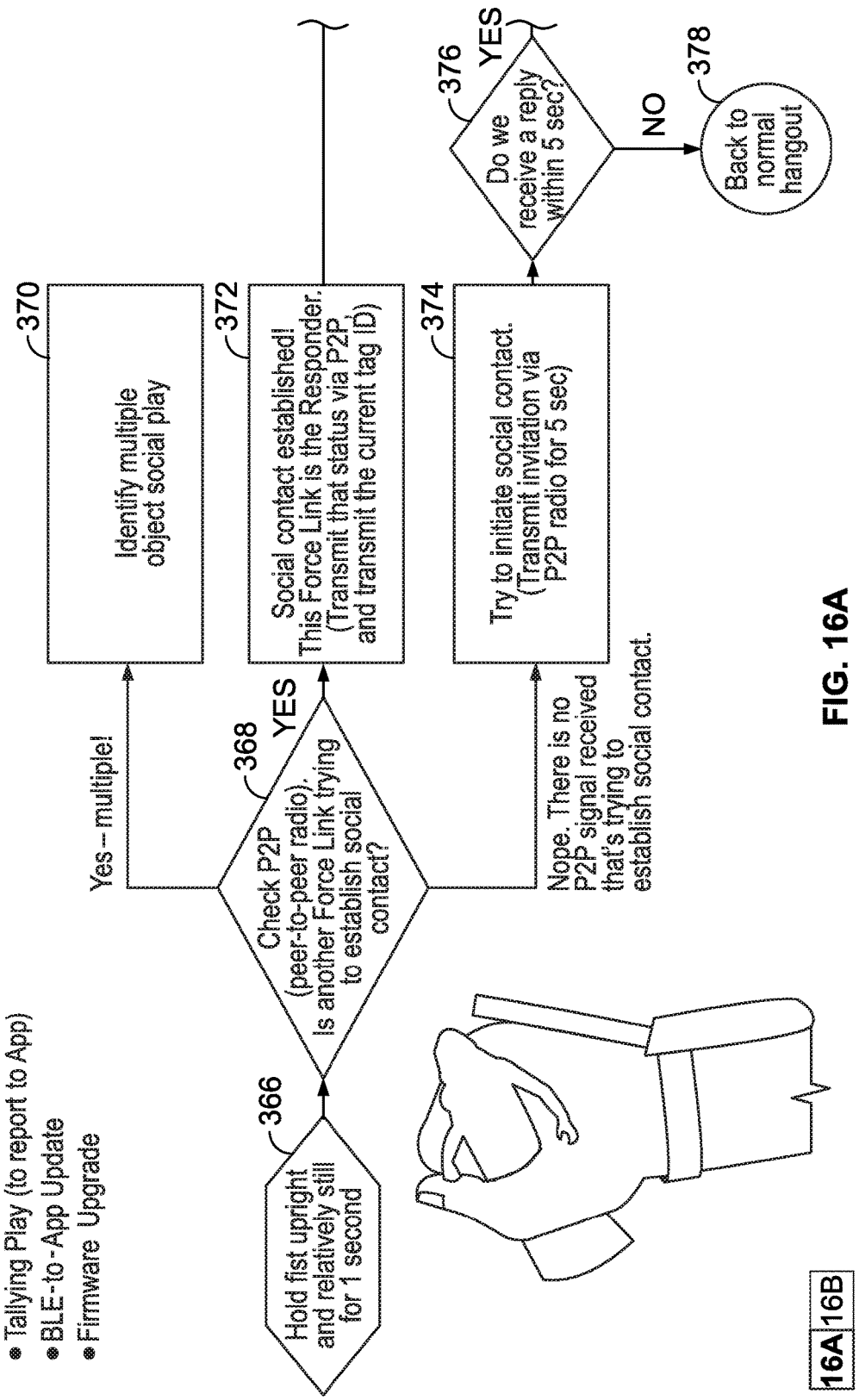
FIGS. 16A and 16B show a flow chart describing initiating game play tag reading for social play tiers and communications between devices.
Figure 16B:
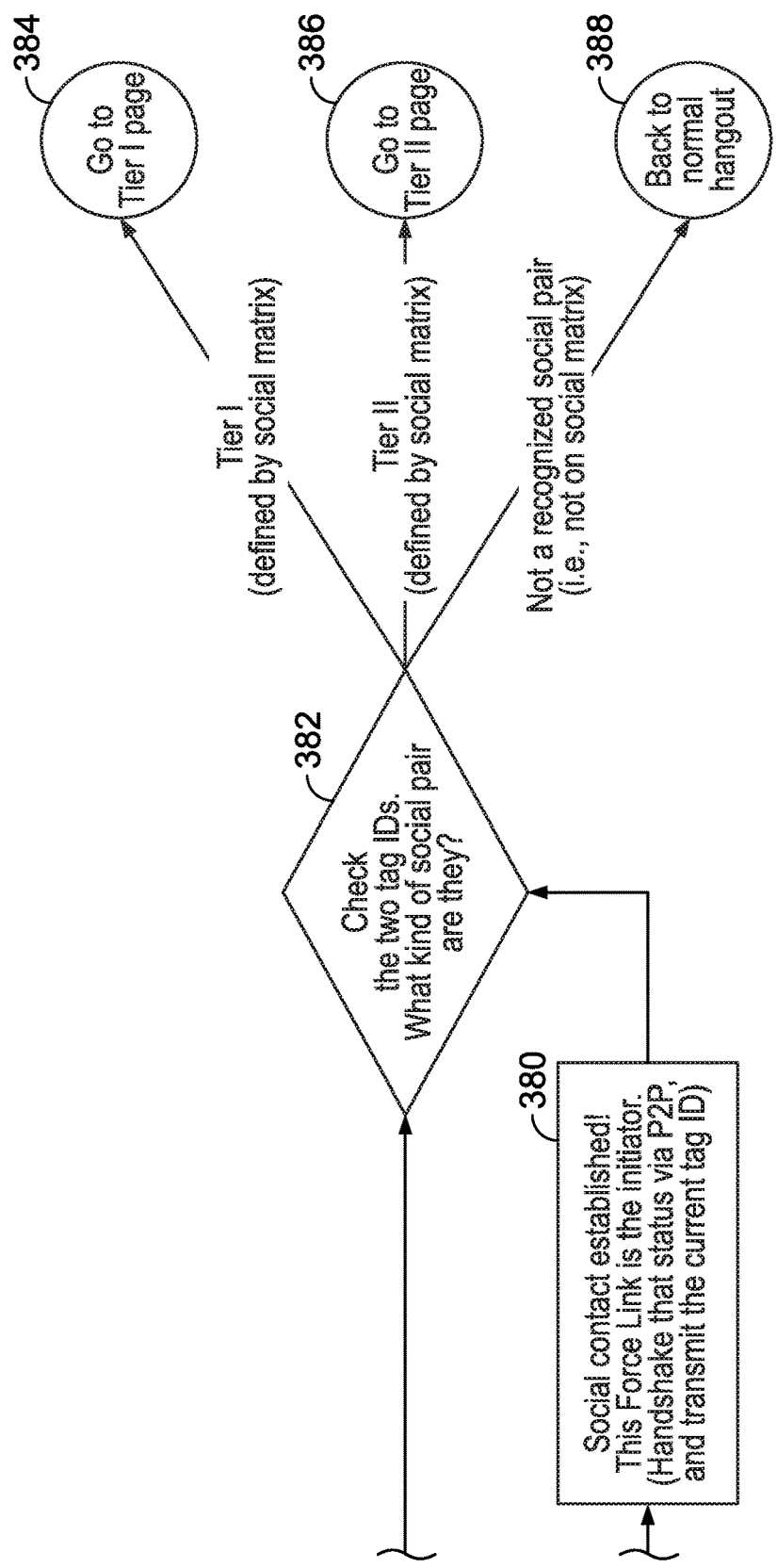

FIGS. 16A and 16B show a flow chart describing initiating game play tag reading for social play tiers and communications between devices. The combination of the toy object unique IDs as two or more toy object pairs responsive the reading steps may define separating the toy object pairs into at least two separate groups based on the combination of the toy object unique IDs. Then determining toy object pairs in the same group as friendly and toy object pairs in different groups as adversarial, the outputting step audio response employing friendly shared output responses for friendly toy object pairs of said determining step, and the outputting step audio response employing adversarial shared output responses for adversarial toy object pairs of said determining step. Thus tier defined toy object pairs have shared output responses as tier 1 object pairs and toy object pairs without shared output responses as tier 2 object pairs, said outputting audio response having shared output responses for tier 1 toy object pairs of said tier defining step, with the outputting step audio response without shared output responses for tier 2 toy object pairs of said tier defining step.

FIG. 16A references figures Force Link 2 version facilitating Social Play (Tier I) and Social Play (Tier II) features, and Tallying Play (to report an App.) as well as BLE-to-App Update/Firmware Upgrades receiving updates through a network interface with the antenna subsystem allowing the master processor to update said play object identifiers, motion subsystem and audio subsystem for additional responsive output behavior and gameplay content. At Block 366 Hold first upright and relatively still for 1 second. Block 368 Check P2P (peer-to-peer radio). Is another Force Link trying to establish social contact No/Yes? No P2P signal received that's trying to establish social contact.

Then Block 370 Identify multiple object social play. Block 372 Social contact established! This Force Link is the Responder. (Transmit that status via P2P, and transmit the current tag ID). Block 374 Try to initiate social contact. (Transmit invitation via P2P radio for 5 sec). Block 376 Do we receive a reply within 5 sec No/Yes? Block 378 Back to normal hangout. At FIG. 16B, Block 380 Social contact established! This Force Link is the initiator. (Handshake that status via P2P, and transmit the current tag ID). Block 382 Check the two tag IDs. What kind of social pair are they? Tier I (defined by social matrix). Block 384 Go to Tier I/Tier II (Defined by social matrix). Block 386 Go to Tier II/Not a recognized social pair (i.e., not on social matrix). Block 388 Back to normal hangout.

Figure 17A:
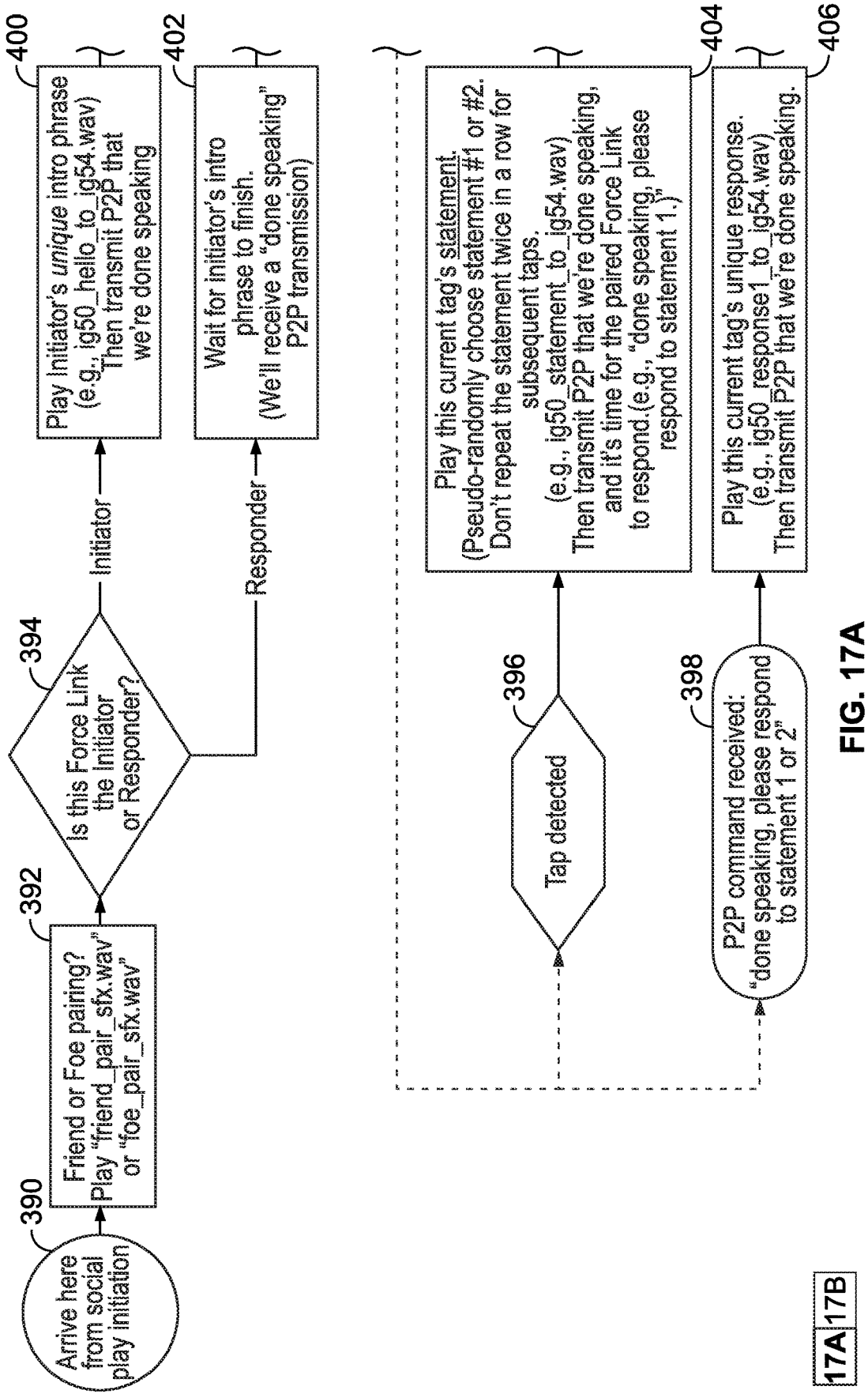
FIGS. 17A and 17B show a flow chart describing tier 1 game play tag reading social play communications.
Figure 17B:
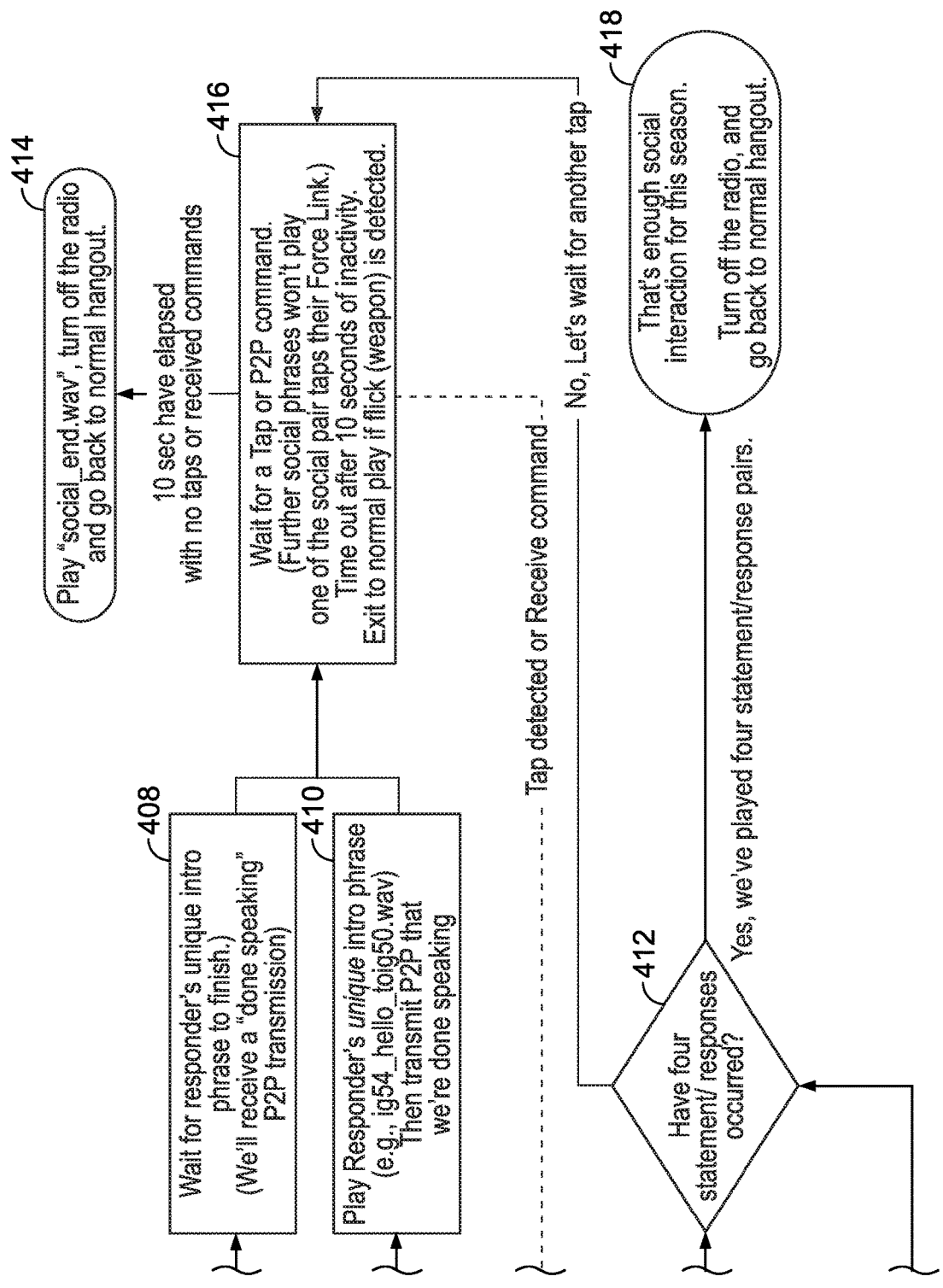

FIGS. 17A and 17B show a flow chart describing tier 1 game play tag reading social play communications, outputting a unique introduction audio output specific to the toy object tag relationship via the first device and transmitting a wireless signal to the second device indicating when the audio is complete. FIG. 17A provided Tier I Social Play Matrix for all way file usage. Block 390 Arrive here from social play initiation. Block 392 Friend or Foe pairing? Play "friend_pair_sfx.wav" or "foe_pair_sfx.wav". Block 394 Is this Force Link the Initiator or Responder? If Initiator, Block 400 Play Initiator's unique intro phrase (e.g., ig50_hello_to-_ig54.wav) then transmit P2P that we're done speaking. If Responder, Wait for initiator's intro phrase to finish (then to peer-to-peer transmission). Block 396 Tap detected. Block 398 P2P command received: "done speaking, please respond to statement 1 or 2." Block 404 Play this current tag's statement. (Pseudo-randomly choose statement #1 or #2. Don't repeat the statement twice in a row for subsequent taps. (e.g., ig50_statement_to-_ig54.wav) Then transmit P2P that we're done speaking, and it's time for the paired Force Link to respond. (e.g., "done speaking, please respond to statement 1.)" Block 406 Play this current tag's unique response. (e.g., ig50_response1_to-_ig54.wav) Then transmit P2P that we're done speaking.

At FIG. 17B, Block 408 Wait for responder's unique intro phrase to finish.)(We'll receive a "done speaking" P2P transmission). Block 410 Play Responder's unique intro phrase (e.g., ig54_hello_toig50.wav) then transmit P2P that we're done speaking. Block 412 Have four statement/responses occurred? Yes, we've played four statement/response pairs. Block 418 that's enough social interaction for this season. Turn off the radio, and go back to normal hangout. No, let's wait for another tap. Tap detected or Receive command. Block 416 Wait for a Tap or P2P command. (Further social phrases won't play one of the social pair taps their Force Link.) Time out after 10 seconds of inactivity. Exit to normal play if flick (weapon) is detected. Block 414 Play "social_end.wav", turn off the radio and go back to normal hangout. 10 sec have elapsed with no taps or received commands.

Figure 18A:
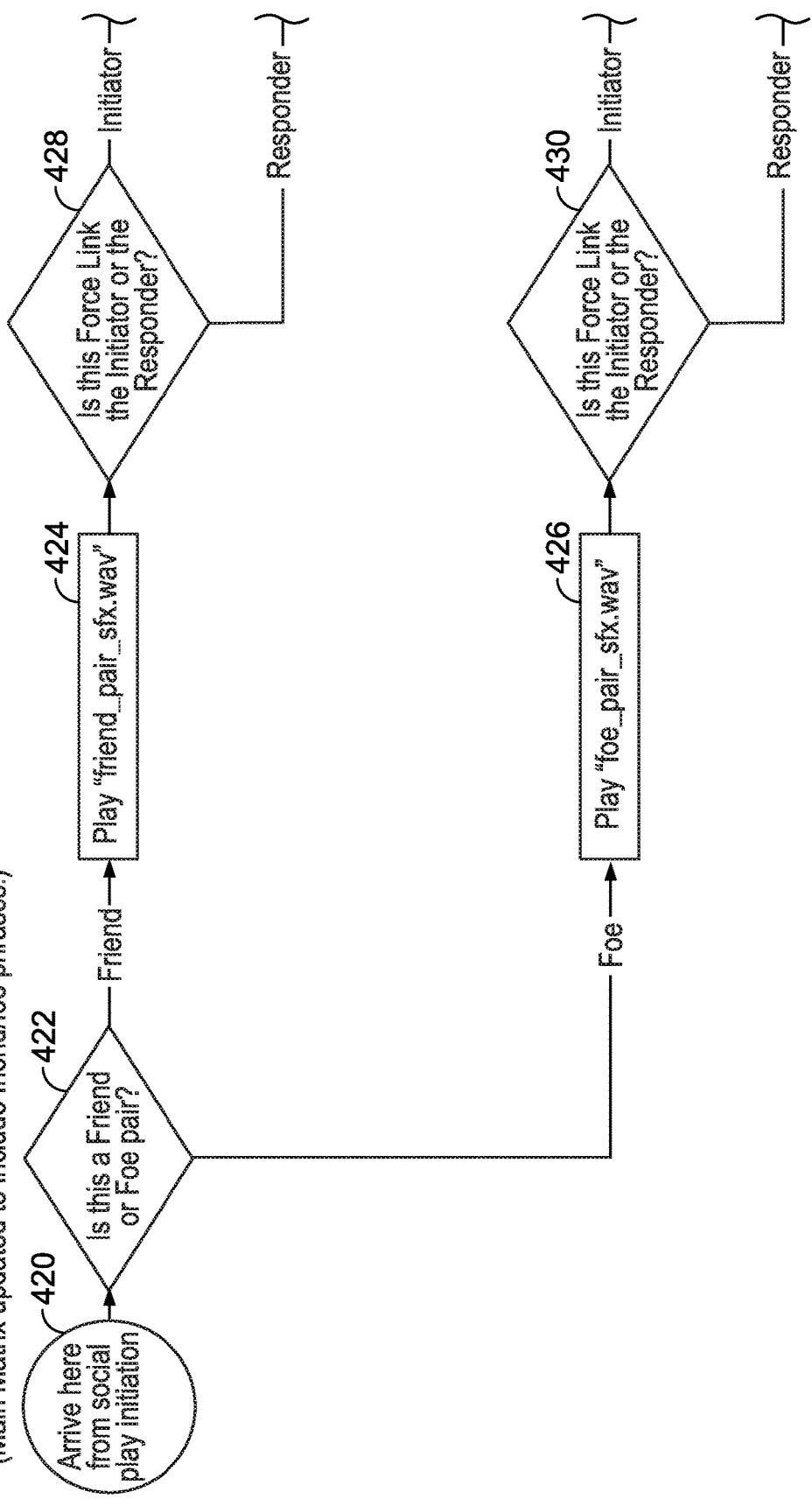
FIGS. 18A and 18B show a flow chart describing tier 2 game play tag reading social play communications.
Figure 18B:
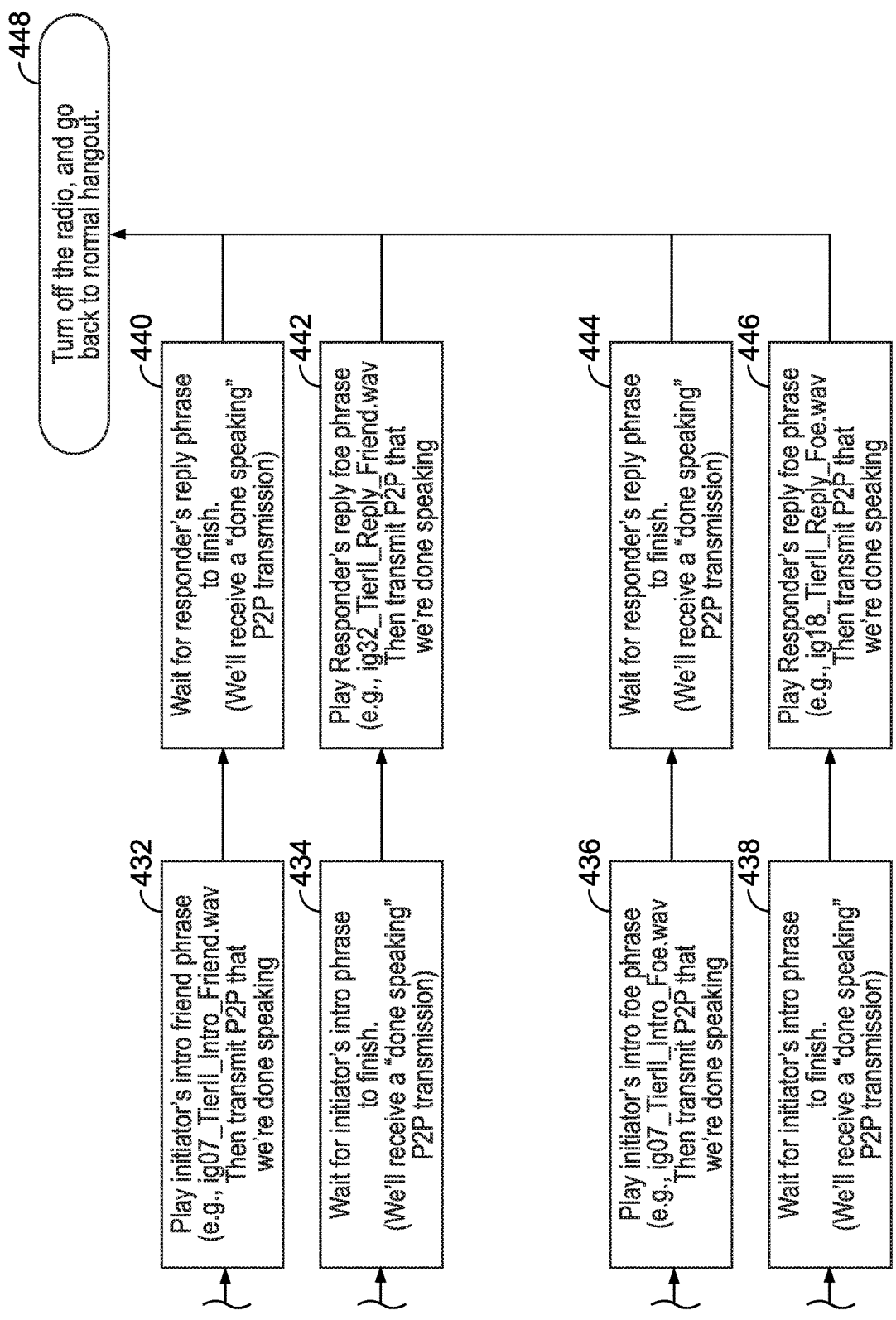

FIGS. 18A and 18B show a flow chart describing tier 2 game play tag reading social play communications, outputting either a generic friendly or generic adversarial audio output via the first device, determined by the generic toy object tag relationship. FIG. 18A, regarding Main Matrix for all way file usage on this page (Main Matrix updated to include friend/foe phrases.) Block 420 Arrive here from social play initiation. Block 422 Is this a Friend or Foe pair? If Friend, Block 424 Play "friend_pair_sfx.wav." Block 428 Is this Force Link the Initiator or the Responder? If Initiator/Responder, Foe Block 426 Play "foe_pair_sfx.wav." Block 430 Is this Force Link the Initiator or the Responder? Initiator/Responder, at FIG. 18B Block 432 Play initiator's intro friend phrase (e.g., ig07_TierII_Intro_Friend.wav Then transmit P2P that we're done speaking. Block 434 Wait for initiator's intro phrase to finish. (We'll receive a "done speaking" P2P transmission). Block 436 Play initiator's intro foe phrase (e.g., ig07_TierII_Intro_Foe.wav Then transmit P2P that we're done speaking. Block 438 Wait for initiator's intro phrase to finish. (We'll receive a "done speaking" P2P transmission). Block 440 Wait for responder's reply phrase to finish. (We'll receive a "done speaking" P2P transmission). Block 442 Play Responder's reply foe phrase (e.g., ig32_TierII_Reply_Friend.wav Then transmit P2P that we're done speaking. Block 444 Wait for responder's reply phrase to finish. (We'll receive a "done speaking" P2P transmission). Block 446 Play Responder's reply foe phrase (e.g., ig18_TierII_Reply_Foe.wav) Then transmit P2P that we're done speaking. Block 448 Turn off the radio, and go back to normal hangout.

Figure 19:
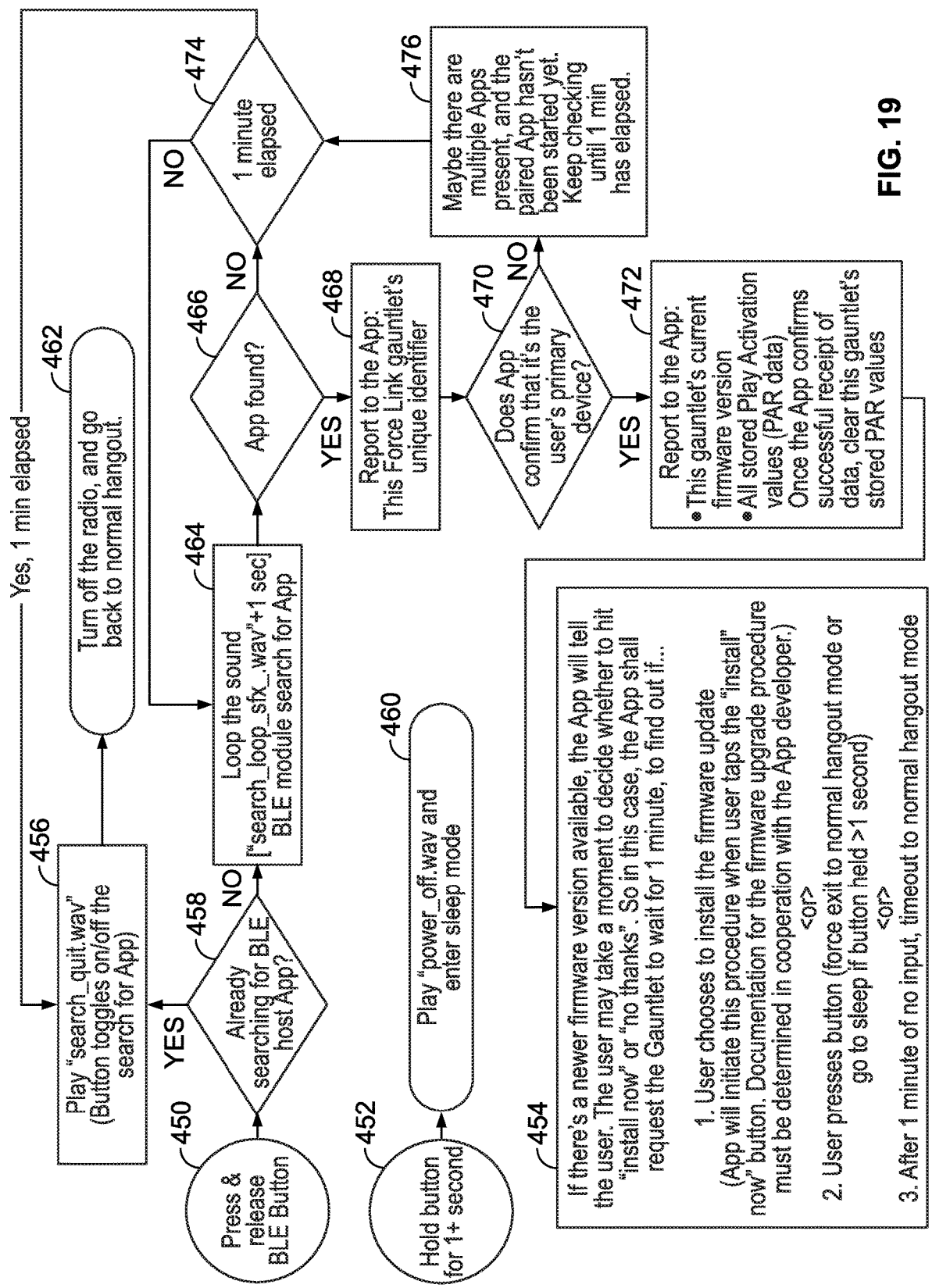
FIG. 19 shows a flow chart describing a receiving updates through a network interface to update said play object identifiers, motion subsystem and audio subsystem for additional responsive output behavior and gameplay content.
Figure 24A:
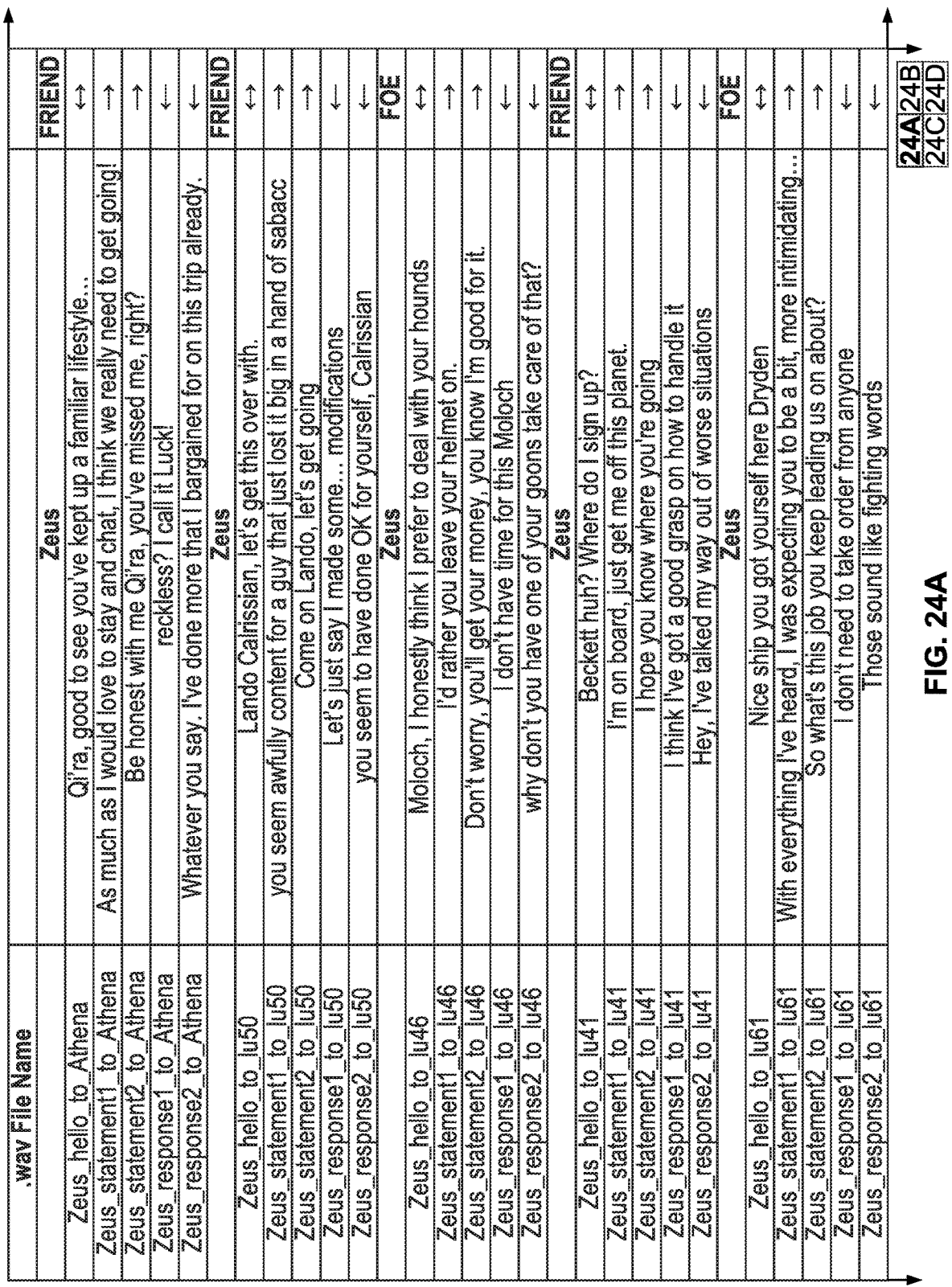
Figure 24C:
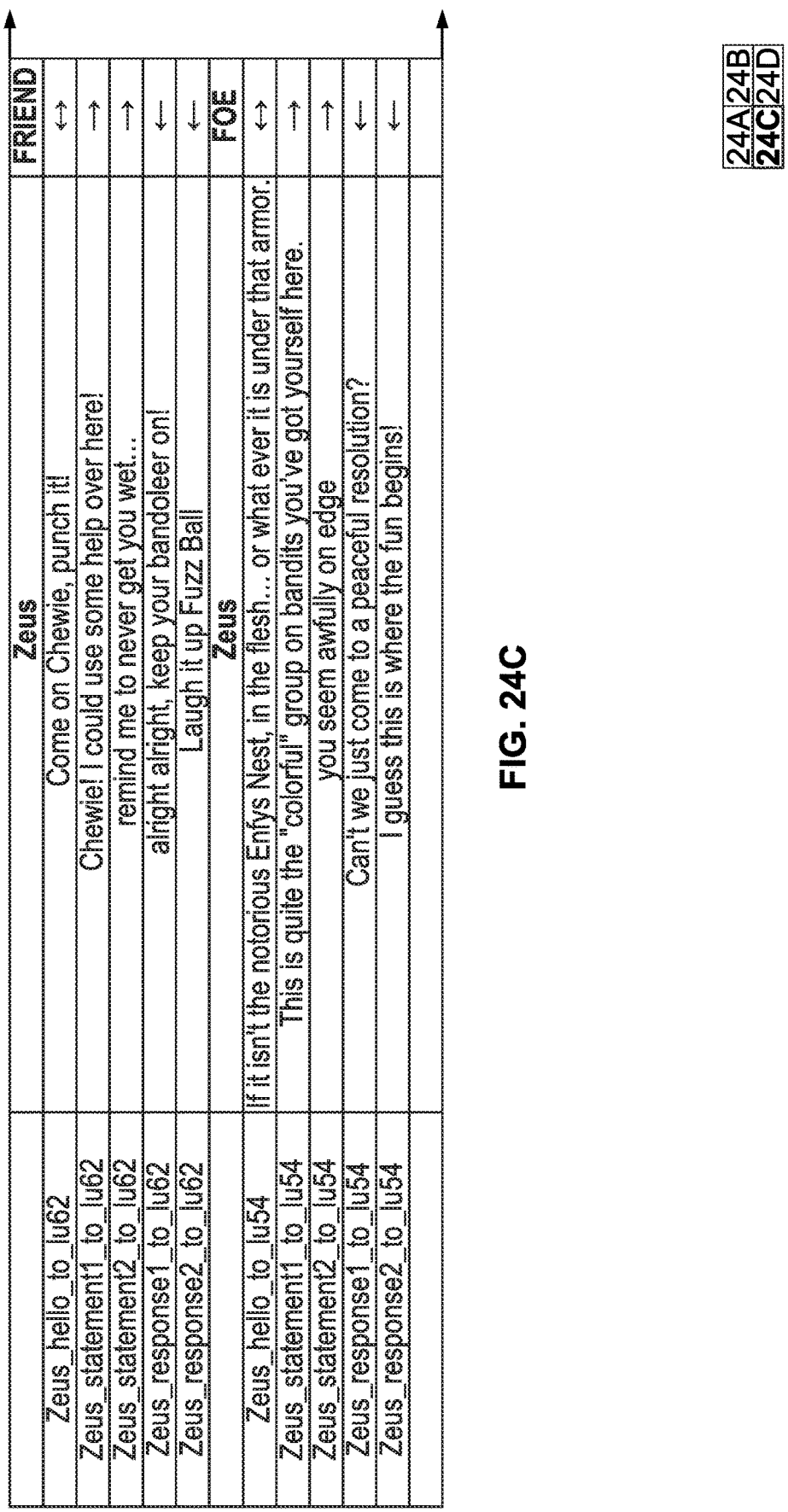

FIG. 19 shows a flow chart describing a receiving updates through a network interface to update said play object identifiers, motion subsystem and audio subsystem for additional responsive output behavior and gameplay content, as well as receiving updates configures the master processor, motion subsystem and audio subsystem for additional previously unrecognized toy objects to be identified. Such embodiments may receive updates over a wired or wireless connection with a smart device or computer such as an iPhone or Android™ device. The network interface may facilitate a remote location configured to query remote registration information containing previously registered, to update the audio, output behavior and gameplay content, collectively firmware.

These updates may add or replace the information stored in the memory to change or add additional phrases or functions for existing characters and vehicles, or allow recognition of additional tags for new figures released in later production. At FIG. 19, Block 450 Press & release BLE Button. Block 452 Hold button for 1+ second. Block 454 If there's a newer firmware version available, the App will tell the user. The user may take a moment to decide whether to hit "install now" or "no thanks". So in this case, the App shall request the Gauntlet to wait for 1 minute, to find out if:

(1) User chooses to install the firmware update app will initiate this procedure when user taps the "install" now" button. These updates may add or replace the information stored in the memory to change or add additional phrases or functions for existing characters and vehicles, or allow recognition of additional tags for new figures released in later production.

Documentation for the firmware upgrade procedure must be determined in cooperation with the App developer); or (2) User presses button (force exit to normal hangout mode or go to sleep if button held >1 second); or (3) After 1 minute of no input, timeout to normal hangout mode. Block 456 Play "search_quit.wav" (Button toggles on/off the search for App). Block 458 Play "search_quit.wav" (Button toggles on/off the search for App). Block 460 Already searching for BLE host App Yes/No? Block 462 Turn off the radio, and go back to normal hangout. Block 464 Loop the sound ("search_loop_sfx_.wav"+1 sec) BLE module search for App. Block 466 App found Yes/No? Block 468 Report to the App: This Force Link gauntlet's unique identifier. Block 470 Does App confirm that it's the user's primary device Yes/No? Block 472 Report to the App: This gauntlet's current firmware version. All stored Play Activation values (PAR data) Once the App confirms successful receipt of data, clear this gauntlet's stored PAR values. Block 474 1 minute elapsed, Yes 1 min elapsed Block 476, there may be multiple Apps present, and the paired App hasn't been started yet. Keep checking until min. has elapsed. The network interface with the antenna subsystem receives updates therewith allowing the master processor to update the play object identifiers, motion subsystem and audio subsystem for additional responsive output behavior and gameplay content, wherein the one or more receiving updates configures the master processor, motion subsystem and audio subsystem for additional previously unrecognized toy objects to be identified.

FIG. 20 provides a columnar chart of the sounds needed in the described embodiment for igniting figures, lunging figures, creatures, vehicles, and backpacks. FIGS. 21A, 21B and 21C show various scenarios with speech and lights described above for an interactive trooper in a tabular format with explanations. The tables accessible to the master processor define the combinations of the toy object unique IDs as two or more toy object pairs, the table separating the toy object pairs into at least two separate groups based on the combination of the toy object unique IDs. The table tier defining toy object pairs separates the audio response employing friendly shared output responses for friendly toy object pairs and audio response employing adversarial shared output responses for adversarial toy object pairs, wherein the plurality of play objects comprises one or more toy figures with associated tag reader and the master processor identifying the first unique ID with first toy object being read in proximity of the first player device with motion subsystem input generating audio subsystem outputs.

FIGS. 22A, 22B, 22C and 22D illustrate the database table used for sound effects and speech related to the various action figure characters, vehicles and accessories. Once a character, a creature or a vehicle is identified, with the creature or vehicle found in the first column. Then, depending on the detected status, such as introduction or battle or motion detected, appropriate columns are found to see what LEDs should be played and what phrases and music should be played, which are pseudo-randomly chosen based on parameters in the running program and previous access to the databases. Columns within in the databases are also chosen based on the type of motion, such as a "tap", "flick" or "sweep".

FIGS. 23A and 23B illustrate the database matrix used for sound effects and speech related to the various action figure playsets. Initially, the location is found in the first column. Then, depending on the detected status, such as another tag in hand or no tag in hand detected, appropriate columns are found to see what sounds should be played and what phrases should be played, which are pseudo-randomly chosen based on parameters in the running program and previous access to the databases. Columns within in the databases are also chosen based on the type of motion, such as a "tap". Initially, the accessory is found in the first column. Then, depending on the detected status, such as the vehicle in hand and movement detected, appropriate columns are found to see what sounds should be played and what phrases should be played, which are pseudo-randomly chosen based on parameters in the running program and previous access to the databases.

FIGS. 24A, 24B, 24C and 24D illustrate the database table used for social play sound effects and speech related to the various paired tier 1 communications action figure creatures and audio output specific to the toy object tag relationship via the first device and transmitting a wireless signal to the second device indicating when the audio is complete.

It is noted that throughout this detailed description, words such as "up," "down," "upward" and "downward," as well as similar positional terms, refer to portions or elements of the launch apparatus as they are viewed in the drawings relative to other portions, or in relationship to the positions of the apparatus as it will typically be held and moved during play by a user, or to movements of elements based on the configurations illustrated.

While the present inventions have been illustrated by a description of various embodiments and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application. Therefore, the aim is to cover all such changes and modifications as fall within the true spirit and scope of the invention. The matters set forth in the foregoing description and accompanying drawings are offered by way of illustrations only and not as limitations. The actual scope of the invention is to be defined by the subsequent claims when viewed in their proper perspective based on the prior art.

What is claimed is:

1. A play activity method for a plurality of play objects with a player body attachment, comprising:
   providing at least one of the plurality of play objects as a first toy object for holding in a player's hand;
   identifying the plurality of play objects with one or more play object identifiers, each of the plurality of play objects comprising a tag for transmitting one or more of the play object identifiers;
   identifying the first toy object with a first unique ID of the play object identifiers;
   providing a first player device wearable with the player body attachment for toy object play activities, the first player device comprising a housing including a master processor for determining an output responsive to one or more play object identifiers, an antenna subsystem with an antenna signal range, an acceleration detecting motion subsystem, and an audio subsystem located at the housing;

detecting player input motions of the player's hand through one or more motions of the player's hand with the motion subsystem;

providing a tag reader in communication with the antenna subsystem and the master processor for identifying the play object identifiers;

reading the first unique ID with the first toy object in proximity of the first player device and within the antenna signal range with the tag reader and the master processor to identify the first toy object;

providing a second player device configured to communicate wirelessly with the antenna subsystem of the first device for communication between the first player device and the second player device;

providing at least one other of the plurality of play objects as a second toy object with a second unique ID for identifying the second toy object by reading the second unique ID with the second toy object in proximity of the first player device;

defining a combination of the toy object unique IDs as toy object pairs responsive the reading steps of the first player device and defining toy object pairs having a close story relationship as tier 1 object pairs and toy object pairs without a direct story interaction as tier 2 object pairs as evaluated by the first player device with both first and second toy objects within proximity of the first player device;

detecting one or more motions of the first toy object associated with the first unique ID with the motion subsystem of the first player device; and outputting at least one audio response with the master processor associating the one or more detected motions with the first unique ID, with the combination of the toy object unique IDs read from the first player device defining the tier toy object pairs.

2. The play activity method recited in claim 1, further comprising identifying each of the plurality of play objects with one or more play object identifiers.

3. The play activity method recited in claim 2, further comprising identifying the plurality of play objects for use with one or more additional players.

4. The play activity method recited in claim 1, wherein the plurality of play objects is selected from the group consisting of toy figure, toy vehicle, toy playset, and toy accessory objects.

5. The play activity method recited in claim 3, further comprising:
reading the unique IDs of the toy objects in proximity of the second player device.

6. The play activity method recited in claim 5, further comprising:
determining toy object pairs according to a friendly group of toy object pairs.

7. The play activity method recited in claim 6, further comprising:
determining toy object pairs according to an adversarial group of toy object pairs;
said outputting step audio response employing friendly output responses for the friendly group of toy object pairs; and
said outputting step audio response employing adversarial output responses for the adversarial group of toy object pairs.

8. The play activity method recited in claim 7, wherein:
said outputting step audio response including said friendly and adversarial output responses of corresponding friendly and adversarial groups of toy object pairs for tier 1 toy object pairs which include both friendly and adversarial groups of toy object pairs and for tier 2 toy object pairs which include both friendly and adversarial groups of toy object pairs.

9. The play activity method recited in claim 1, further comprising receiving updates through a network interface with the antenna subsystem allowing the master processor to update said play object identifiers, motion subsystem and audio subsystem for additional responsive output behavior and gameplay content.

10. The play activity method recited in claim 9, wherein the one or more receiving updates configures the master processor, motion subsystem and audio subsystem for additional previously unrecognized toy objects to be identified.

11. A wearable apparatus for toy object play activities, comprising:
a player body attachment;
a first player device housing wearable with the player body attachment;
a master processor at the housing;
an acceleration detecting motion subsystem input to the master processor where the master processor detects player input motions of the player's hand through one or more motions of the player's hand with the motion subsystem of the first player device;
an antenna subsystem with an antenna signal range to transmit and receive with the master processor for determining play object identifiers of at least a first and a second toy object respectively having first and second tags for transmitting one or more of the play object identifiers and identifying the first toy object with a first unique ID and the second toy object with a second unique ID of the play object identifiers, the first unique ID with the first toy object being read in proximity of the first player device and within the antenna signal range for the master processor to identify the first toy object held at the player's hand and the second unique ID with the second toy object being read in proximity of the first player device;
a second player device configured to communicate wirelessly with the antenna subsystem of the first device for communication between the first player device and the second player device;
a tag reader in communication with the antenna subsystem and the master processor detecting one or more motions associated with the first unique ID with the motion subsystem of the first player device with the first toy object held at the player's hand; and
an audio subsystem coupled to the master processor and configured for issuing verbal announcements and sound effects responsive to the master processor associating the one or more detected motions with the first unique ID with a combination of the toy object unique IDs read from the first player device, wherein the combination of toy object unique IDs define tier toy object pairs, wherein a tier toy object pair with a close story relationship is a tier 1 object pair and a toy object pair without a direct story interaction is a separate tier 2 object pair as evaluated by the first player device with both first and second toy objects within proximity of the first player device.

12. The play activity system recited in claim 11, further comprising a table accessible to the master processor defining the combination of the toy object unique IDs as the tier toy object pairs, with the master processor determining toy object pairs according to a friendly group of toy object pairs and further according to an adversarial group of toy object pairs.

13. The play activity system recited in claim 11, further comprising a network interface with the antenna subsystem receiving updates therewith allowing the master processor to update said play object identifiers, motion subsystem and audio subsystem for additional responsive output behavior and gameplay content, wherein the one or more receiving updates configures the master processor, motion subsystem and audio subsystem for additional previously unrecognized toy objects to be identified.

14. A play activity system for a plurality of play objects with a player body attachment, comprising:
   a first toy object comprising a first tag for transmitting one or more play object identifiers, and identifying the first toy object with a first unique ID of the play object identifiers;
   a player body attachment;
   a first player device wearable with the player body attachment, the first player device comprising:
      a housing,
      a master processor for determining an output responsive to one or more play object identifiers,
      an antenna subsystem with an antenna signal range to transmit and receive,
      a tag reader in communication with the antenna subsystem and the master processor identifying the play object identifiers,
      a motion detecting subsystem, the master processor detecting one or more motions therewith, and
      an audio subsystem located at the housing for outputting verbal announcements and sound effects, the tag reader and the master processor identifying the first unique ID with the first toy object being read in proximity of the first player device and within the antenna signal range for the master processor to identify the first toy object;
   a second player device configured to communicate wirelessly with the antenna subsystem of the first device for communication between the first player device and the second player device; and
   a second toy object with a second unique ID for identifying the second toy object by reading the second unique ID with the second toy object in proximity of the first player device, wherein the verbal announcements and sound effects output from the audio subsystem are configured to be responsive to the master processor associating the one or more detected motions with the first unique ID with a combination of the toy object unique IDs read from the first player device;
   wherein the combination of toy object unique IDs define tier toy object pairs, wherein a tier toy object pair with a close story relationship is a tier 1 object pair and a toy object pair without a direct story interaction is a separate tier 2 object pair as evaluated by the first player device with both first and second toy objects within proximity of the first player device.

15. The play activity system recited in claim 14, wherein the master processor detects one or more motions of the player's hand with the motion detecting subsystem of the first player device.

16. The play activity system recited in claim 14, wherein the plurality of play objects is selected from the group consisting of toy figure, toy vehicle, toy playset, and toy accessory objects.

17. The play activity system recited in claim 14, wherein the plurality of play objects comprises one or more toy figures with associated tag reader and the master processor identifying the first unique ID with the first toy object being read in proximity of the first player device with the master processor generating audio subsystem outputs for igniting, sweep, and lunging figures.

18. The play activity system recited in claim 14, further comprising:
   said second player device identifying the plurality of play objects for use with one or more additional players; and
   said second player device reading the unique IDs of the toy objects in proximity thereof and initiating communication between the first player device and the second player device based on detected motion.

19. The play activity system recited in claim 18, further comprising:
   a table accessible to the master processor defining the combination of the toy object unique IDs as the tier toy object pairs with the master processor determining toy object pairs according to a friendly group of toy object pairs and further according to an adversarial group of toy object pairs.

20. The play activity system recited in claim 14, further comprising a network interface with the antenna subsystem receiving updates therewith allowing the master processor to update said play object identifiers, and audio subsystem for additional responsive output behavior and gameplay content, wherein the one or more receiving updates configures the master processor for additional previously unrecognized toy objects to be identified.

* * * * *